United States Patent
Parrag et al.

(10) Patent No.: US 12,473,326 B2
(45) Date of Patent: Nov. 18, 2025

(54) CRYSTALLINE FORMS OF DEXAMETHASONE DIMERS AND USES THEREOF

(71) Applicant: Ripple Therapeutics Corporation, Toronto (CA)

(72) Inventors: Ian Charles Parrag, Mississauga (CA); Matthew Alexander John Statham, Milton (CA); Emma-Louise Elizabeth Moore, Mississauga (CA); Bahareh Khalili, Mississauga (CA); Judith Anne Williams, Toronto (CA); Elizabeth Poloz, Kitchener (CA); Boris Gorin, Oakville (CA)

(73) Assignee: Ripple Therapeutics Corporation, Toronto (CA)

( * ) Notice: Subject to any disclaimer, the term of this patent is extended or adjusted under 35 U.S.C. 154(b) by 948 days.

(21) Appl. No.: 17/426,779

(22) PCT Filed: Jan. 31, 2020

(86) PCT No.: PCT/CA2020/050117
§ 371 (c)(1),
(2) Date: Jul. 29, 2021

(87) PCT Pub. No.: WO2020/154815
PCT Pub. Date: Aug. 6, 2020

(65) Prior Publication Data
US 2022/0089635 A1    Mar. 24, 2022

Related U.S. Application Data

(63) Continuation-in-part of application No. PCT/CA2019/050136, filed on Feb. 1, 2019.

(60) Provisional application No. 62/883,170, filed on Aug. 6, 2019.

(51) Int. Cl.
| | | |
|---|---|---|
| *C07J 5/00* | (2006.01) | |
| *A61K 8/00* | (2006.01) | |
| *A61P 19/02* | (2006.01) | |
| *B29C 35/02* | (2006.01) | |
| *B29C 49/00* | (2006.01) | |
| *B29K 105/00* | (2006.01) | |

(52) U.S. Cl.
CPC ............. *C07J 5/0076* (2013.01); *A61K 8/00* (2013.01); *A61P 19/02* (2018.01); *B29C 35/02* (2013.01); *B29C 49/0006* (2022.05); *B29K 2105/0035* (2013.01); *C07B 2200/13* (2013.01)

(58) Field of Classification Search
CPC ................. C07J 5/0076; C07B 2200/13
See application file for complete search history.

(56) References Cited

U.S. PATENT DOCUMENTS

| | | |
|---|---|---|
| 3,147,183 A | 9/1964 | Joachim et al. |
| 3,591,612 A | 7/1971 | Allais et al. |
| 3,663,579 A | 5/1972 | Stache et al. |
| 4,024,871 A | 5/1977 | Stephenson |
| 4,532,316 A | 7/1985 | Henn |
| 4,833,215 A | 5/1989 | Jedlinski et al. |
| 4,916,193 A | 4/1990 | Tang et al. |
| 5,013,841 A | 5/1991 | Matsumoto et al. |
| 5,217,493 A | 6/1993 | Raad et al. |
| 5,250,524 A | 10/1993 | Kramer et al. |
| 5,321,099 A | 6/1994 | Goldwasser et al. |
| 5,387,598 A | 2/1995 | Rossignol |
| 5,512,558 A | 4/1996 | Enhsen et al. |
| 5,578,621 A | 11/1996 | Rossignol |
| 5,798,115 A | 8/1998 | Santerre et al. |
| 5,856,348 A | 1/1999 | Rossignol |
| 5,859,038 A | 1/1999 | Rossignol |
| 5,886,013 A | 3/1999 | Rossignol |
| 5,965,590 A | 10/1999 | Rossignol |
| 5,968,961 A | 10/1999 | Rossignol |
| 6,020,353 A | 2/2000 | Rossignol |
| 6,051,576 A | 4/2000 | Ashton et al. |
| 6,096,525 A | 8/2000 | Patnaik |
| 6,117,894 A | 9/2000 | Rossignol |
| 6,127,507 A | 10/2000 | Santerre |
| 6,299,604 B1 | 10/2001 | Ragheb et al. |
| 6,344,035 B1 | 2/2002 | Chudzik et al. |
| 6,429,300 B1 | 8/2002 | Kurz et al. |
| 6,602,915 B2 | 8/2003 | Uhrich |

(Continued)

FOREIGN PATENT DOCUMENTS

| | | |
|---|---|---|
| CA | 2461099 A1 | 4/2003 |
| CA | 2467321 A1 | 11/2005 |

(Continued)

OTHER PUBLICATIONS

Bhattacharya et al. (Brittain, ed. Polymorphism in Pharmaceutical Solids, 2009, p. 334.*
Bernstein et al. (International Tables for Crystallography, 2019, vol. H, Chapter 7.5, pp. 767-781).*
BE 616548, Chemical Abstract 1963, vol. 59, No. 1717 (1963) (English Abstract).
Carrilho et al. A new facile synthesis of steroid dimers containing 17,17'-dicarboxamide spacers. Tetrahedron Letters 54:2763-2765 (2013).
Kalinowski et al. The influence of bolaamphiphilic steroid dimer on the formation and structure of bilayer lipid membranes. Cellular and Molecular Biology Letters 5(1):107-118 (2000).

(Continued)

*Primary Examiner* — Susanna Moore
(74) *Attorney, Agent, or Firm* — Faegre Drinker Biddle & Reath LLP

(57) ABSTRACT

The disclosure features polymorphs of a prodrug dimer of dexamethasone linked at the 21-C and 21'-C carbons via a carbonate-triethylene glycol-carbonate linker. Also disclosed are pharmaceutical compositions and articles comprising said polymorphs, and the use thereof in the treatment of a disease or condition, e.g. via the extended or controlled release of dexamethasone from said articles.

12 Claims, 15 Drawing Sheets

(56) References Cited

U.S. PATENT DOCUMENTS

| | | |
|---|---|---|
| 6,689,350 B2 | 2/2004 | Uhrich |
| 6,703,037 B1 | 3/2004 | Hubbell et al. |
| 6,770,725 B2 | 8/2004 | Santerre |
| 8,349,309 B2 | 1/2013 | Santerre et al. |
| 8,968,626 B2 | 3/2015 | Pham et al. |
| 9,056,048 B2 | 6/2015 | Diamond et al. |
| 10,588,862 B2 | 3/2020 | Parrag et al. |
| 10,632,075 B2 | 4/2020 | Parrag et al. |
| 10,945,958 B2 | 3/2021 | Parrag et al. |
| 10,959,954 B2 | 3/2021 | Parrag et al. |
| 2003/0035787 A1 | 2/2003 | Uhrich |
| 2003/0039689 A1 | 2/2003 | Chen et al. |
| 2003/0118528 A1 | 6/2003 | Walters et al. |
| 2003/0158598 A1 | 8/2003 | Ashton et al. |
| 2003/0203030 A1 | 10/2003 | Ashton et al. |
| 2004/0087664 A1 | 5/2004 | Marcus et al. |
| 2004/0180036 A1 | 9/2004 | Ashton et al. |
| 2005/0008695 A1 | 1/2005 | Ashton et al. |
| 2005/0031577 A1 | 2/2005 | Uhrich |
| 2005/0070470 A1 | 3/2005 | Coy et al. |
| 2005/0159609 A1 | 7/2005 | King et al. |
| 2005/0164994 A1 | 7/2005 | Ashton et al. |
| 2005/0220839 A1 | 10/2005 | DeWitt et al. |
| 2005/0255079 A1 | 11/2005 | Santerre et al. |
| 2006/0247216 A1 | 11/2006 | Haj-Yehia |
| 2007/0031472 A1 | 2/2007 | Huang et al. |
| 2009/0124591 A1 | 5/2009 | Diamond et al. |
| 2010/0062974 A1 | 3/2010 | LaRonde et al. |
| 2013/0096097 A1 | 4/2013 | Kasai et al. |
| 2013/0289223 A1 | 10/2013 | Santerre et al. |
| 2014/0256696 A1 | 9/2014 | Sinha et al. |
| 2016/0038651 A1 | 2/2016 | Santerre et al. |
| 2018/0318318 A1 | 11/2018 | Wang et al. |
| 2019/0247311 A1 | 8/2019 | Parrag et al. |
| 2021/0030667 A1 | 2/2021 | Parrag et al. |
| 2021/0113457 A1 | 4/2021 | Parrag et al. |
| 2021/0205222 A1 | 7/2021 | Parrag et al. |
| 2022/0288277 A1 | 9/2022 | Parrag et al. |
| 2022/0289787 A1 | 9/2022 | Parrag et al. |
| 2023/0225975 A1 | 7/2023 | Parrag et al. |

FOREIGN PATENT DOCUMENTS

| | | | |
|---|---|---|---|
| CA | 2571320 A1 | 11/2005 | |
| CA | 2906238 A1 | 9/2014 | |
| CH | 592687 A5 | 11/1977 | |
| CN | 1968715 B | 12/2010 | |
| FR | 2007815 A1 | 1/1970 | |
| JP | H07501470 A | 2/1995 | |
| JP | H0924093 A | 1/1997 | |
| JP | 2000501318 A | 2/2000 | |
| JP | 2007537168 A | 12/2007 | |
| WO | WO-9010437 A1 | 9/1990 | |
| WO | WO-9511907 A1 | 5/1995 | |
| WO | WO-9520567 A1 | 8/1995 | |
| WO | WO-9528393 A1 | 10/1995 | |
| WO | WO-9729778 A2 | 8/1997 | |
| WO | WO-9807458 A1 | 2/1998 | |
| WO | WO-9850035 A1 | 11/1998 | |
| WO | WO-9906430 A1 | 2/1999 | |
| WO | WO-9912990 A1 | 3/1999 | |
| WO | WO-0209768 A2 | 2/2002 | |
| WO | WO-03028527 A2 | 4/2003 | |
| WO | WO-03040104 A1 | 5/2003 | |
| WO | WO-03043657 A1 | 5/2003 | |
| WO | WO-2004016214 A2 | 2/2004 | |
| WO | WO-2005009480 A2 | 2/2005 | |
| WO | WO-2005110485 A1 | 11/2005 | |
| WO | WO-2010062562 A1 | 6/2010 | |
| WO | WO-2011120044 A1 | 9/2011 | |
| WO | WO-2014139033 A1 | 9/2014 | |
| WO | WO-2015168014 A1 | 11/2015 | |
| WO | WO-2017083794 A1 | 5/2017 | |
| WO | WO-2019148291 A1 | 8/2019 | |
| WO | WO-2019148293 A1 | 8/2019 | |
| WO | WO-2019148294 A1 | 8/2019 | |
| WO | WO-2020154815 A1 | 8/2020 | |
| WO | WO-2021005417 A1 | 1/2021 | |
| WO | WO-2021014217 A1 | 1/2021 | |

OTHER PUBLICATIONS

Rabouina et al. Synthesis and preliminary biological evaluation of estrone dimers. Letters in Drug Design & Discovery 4(3):171-174 (2007) (Abstract only).
U.S. Appl. No. 16/966,452 Office Action dated Dec. 2, 2022.
U.S. Appl. No. 16/966,453 Office Action dated Jul. 25, 2022.
U.S. Appl. No. 17/145,093 Office Action dated Dec. 19, 2022.
U.S. Appl. No. 17/145,093 Office Action dated Mar. 14, 2022.
U.S. Appl. No. 18/170,403 Office Action dated Sep. 13, 2023.
Bach et al., Retention of Antibacterial Activity and Bacterial Colonization of Antiseptic-Bonded Central Venous Catheters. J. Antimicrob. Chemother. 37:315-322 (1996).
Berge et al. Pharmaceutical Salts. Journal of Pharmaceutical Sciences 66(1):1-19 (Jan. 1977).
Blondeau. Fluoroquinolones: mechanism of action, classification, and development of resistance. Sury Ophthalmol. 49 Suppl 2:S73-8 (2004).
Budavari. The Merck Index—Fourteenth Edition Merck Research Laboratories. Whitehouse Station, NJ, pp. 1306-1307 (2006).
Burger. Isosterism and Bioisosterism in Drug Design, in Progress in Drug Research 287-328 (Ernst Jucker, ed., Birkhauser Verlag) (1991).
Chanphai et al. Conjugation of steroids with PAMAM nanoparticles. Colloids and Surfaces B: Biointerfaces 136:1035-1041 (2015).
Cheng et al., Intravitreal sustained-release dexamethasone device in the treatment of experimental uveitis. Invest Ophthalmol Vis Sci. 36(2):442-53 (1995).
Chirife et al., In vitro antibacterial activity of concentrated polyethylene glycol 400 solutions. Antimicrob Agents Chemother. 24(3):409-12 (1983).
Coessens et al., Synthesis and In Vitro Stability of Macromolecular Prodrugs of Norfloxacin. J. Cont. Release 47:283-291 (1997).
Ditizio et al., A Liposomal Hydrogel for the Prevention of Bacterial Adhesion to Catheters. Biomaterials 19:1877-1884 (1998).
Gaudana et al. Ocular drug delivery. AAPS J. 12(3):348-360 (2010).
Ghosh. Monomers and Polymers from Nalidixic Acid—Synthesis, Characterization, and Hydrolysis Study, in Progress in Biomedical Polymers, Ed. Gebekin et al., Plenum Press, New York, pp. 335-345 (1990).
Ghosh. Studies Directed Towards Polymeric Quinloone Antibiotics—Synthesis of Potential Monomers From Nalidixic Acid. Polymeric Mat. Sci. Engin. 59:790-793 (1988).
Gower et al. Drug discovery in ophthalmology: past success, present challenges, and future opportunities. BMC Ophthalmology 16:11 (Jan. 16, 2016).
Howard-Sparks et al. A Novel Chemical Delivery System Comprising an Ocular Sustained Re-lease Formulation of a 3a-17a-21-trihydroxy-5B-pregnan-20-one-BIS-5-Fluorouracil Coding. Drug Dev Ind Pharm 33:677-682 (2007).
Janout et al., Bioconjugate-Based Molecular Umbrellas. Bioconjugate Chemistry, 20(2):183-192 (E-Pub Nov. 20, 2008).
Janout et al. Molecular umbrella-amphotercin B conjugates. Bioconjugate Chemistry 25:1408-1411 (2014).
Kanra et al., The short-term efficacy and safety of dexamethasone implant in a difficult-to-treat patient population with persistent diabetic macular edema. Ret Vit. 26(3):221-7 (2017) (English Abstract).
Kerns et al., Piperazinyl-linked fluoroquinolone dimers possessing potent antibacterial activity against drug-resistant strains of *Staphylococcus aureus*. Bioorg Med Chem Lett. 13(10):1745-9 (2003).
Li et al., Dimeric and Oligomeric Steroids. Chem Rev. 97(1):283-304 (1997).
Michael et al. Enhanced RNA binding of dimerized aminoglycosides. Bioorg Med Chem 7:1361-1371 (1999).

(56) References Cited

OTHER PUBLICATIONS

Modak et al., A New Method for the Direct Incorporation of Antibiotic in Prosthetic Vascular Grafts. Surg. Gynecol. Obstet. 164:143-147 (1987).
Morimoto et al. New dimeric morphine from opium poppy (*Papaver somuniferum*) and its physiological function. J Nat Prod 66(7):987-989 (2003).
Nahar et al. A review on steroid dimers: 2011-2019. Steroids 164:108736 (2020).
Nahar et al. A review on synthetic and natural steroid dimers: 1997-2006. Current Medicinal Chemistry 14:1349-1370 (2007).
Nathan et al., Copolymers of Lysine and Polyethylene Glycol: A New Family of Functionalized Drug Carriers. Bioconjug. Chem. 4:54-62 (1993).
Nishida et al., Studies on synthesis of antibacterial agent (NM441). I. Kinetics and mechanism of the reaction of 4-(bromomethyl)-5-methyl-1,3-dioxol-2-one with 1-substituted piperazine (NM394). Bull Chem Soc Jpn. 67:1419-26 (1994).
Nosova et al., Synthesis of new fluorinated derivatives of quinolinecarboxylic acids. Chem Heterocycl Compd 38(8):922-8 (2002).
Paryze et al., A new approach to steroid dimers and macrocycles by the reaction of 3-chlorocarbonyl derivatives of bile acids with O,O-, N,N-, and S,S-dinucleophiles. Tetrahedron Lett. 53(46):6212-5 (2012).
Patani et al. Bioisosterism: A Rational Approach in Drug Design. Chem. Rev. 96:3147-3176 (1996).
PCT/CA2014/050284 International Search Report and Written Opinion dated Jun. 2, 2014.
PCT/CA2019/050133 International Search Report and Written Opinion dated Apr. 29, 2019.
PCT/CA2019/050135 International Search Report and Written Opinion dated Apr. 29, 2019.
PCT/CA2019/050136 International Search Report and Written Opinion dated Apr. 29, 2019.
PCT/CA2020/050117 International Search Report and Written Opinion dated Apr. 15, 2020.
PCT/IB2020/000620 International Search Report and Written Opinion dated Oct. 30, 2020.
PCT/IB2020/000656 International Search Report and Written Opinion dated Nov. 16, 2020.
PCT/IB2020/000663 International Search Report and Written Opinion dated Dec. 1, 2020.
Peng et al. Pharmacological properties of bivalent ligands containing butorphan linked to nalbuphine, naltrexone, and naloxone at mu, delta, and kappa opioid receptors. J Med Chem 50(9):2254-2258 (2007).
Ren et al., Macromolecular prodrug of dexamethasone prevents particle-induced peri-implant osteolysis with reduced systemic side effects. J Control Release. 175:1-9 (2014) (24 pages).
Roseeuw et al., Polymeric Prodrugs of Antibiotics with Improved Efficiency. J. Mater. Sci. Mater. Med. 10:743-746 (1999).
Sarker et al. Chapter 6: Applications of Steroid Dimers. in Steroid Dimer: Chemistry and Applications in Drug Design and Delivery, John Wiley & Sons Ltd. pp. 379-407 (2012).
Sinha. New findings on biological factors predicting addiction relapse vulnerability. Curr Psychiatry Rep 13(5):398-405 (2011).
Step-growth Polymerization. http://en.wikipedia.org/wiki/Step-growth_polymerization, retrieved on Jan. 12, 2012 (11 pages).
Svobodova et al. Recent advances in steroidal supramolecular gels. RSC Advances 2:4985-5007 (2012).
U.S. Appl. No. 16/396,135 Office Action dated Jul. 3, 2019.
U.S. Appl. No. 16/396,400 Office Action dated Jun. 24, 2019.
U.S. Appl. No. 16/396,400 Office Action dated Oct. 15, 2019.
U.S. Appl. No. 16/396,400 Response to Non-Final Office Action dated Sep. 24, 2019.
U.S. Appl. No. 16/698,372 Office Action dated Jan. 21, 2020.
U.S. Appl. No. 16/698,372 Office Action dated May 26, 2020.
U.S. Appl. No. 16/699,305 Office Action dated Feb. 3, 2020.
U.S. Appl. No. 16/699,305 Office Action dated May 26, 2020.
Woo et al., Biological characterization of a novel biodegradable antimicrobial polymer synthesized with fluoroquinolones, J. Biomat. Res., 59(1):35-45 (2002).
Woo et al., Synthesis and characterization of a novel biodegradable antimicrobial polymer, Biomaterials, 21:1235-1246 (2000).
Xue et al., New dimeric cholesteryl-based A(LS)2 gelators with remarkable gelling abilities: organogel formation at room temperature. J Colloid Interface Sci. 361(2):556-64 (2011).
Yang et al. Utilization of quinolone drugs as monomers: characterization of the synthesis reaction products for poly(norfloxacin diisocyanatododecane polycaprolactone). Biomacromolecules 2(1):134-41 (2001).
Saraiya et al. Dexamethasone for ocular inflammation. Expert Opin Pharmacother 12(7):1127-31 (2011).
U.S. Appl. No. 18/170,403 Office Action dated Feb. 26, 2024.

\* cited by examiner

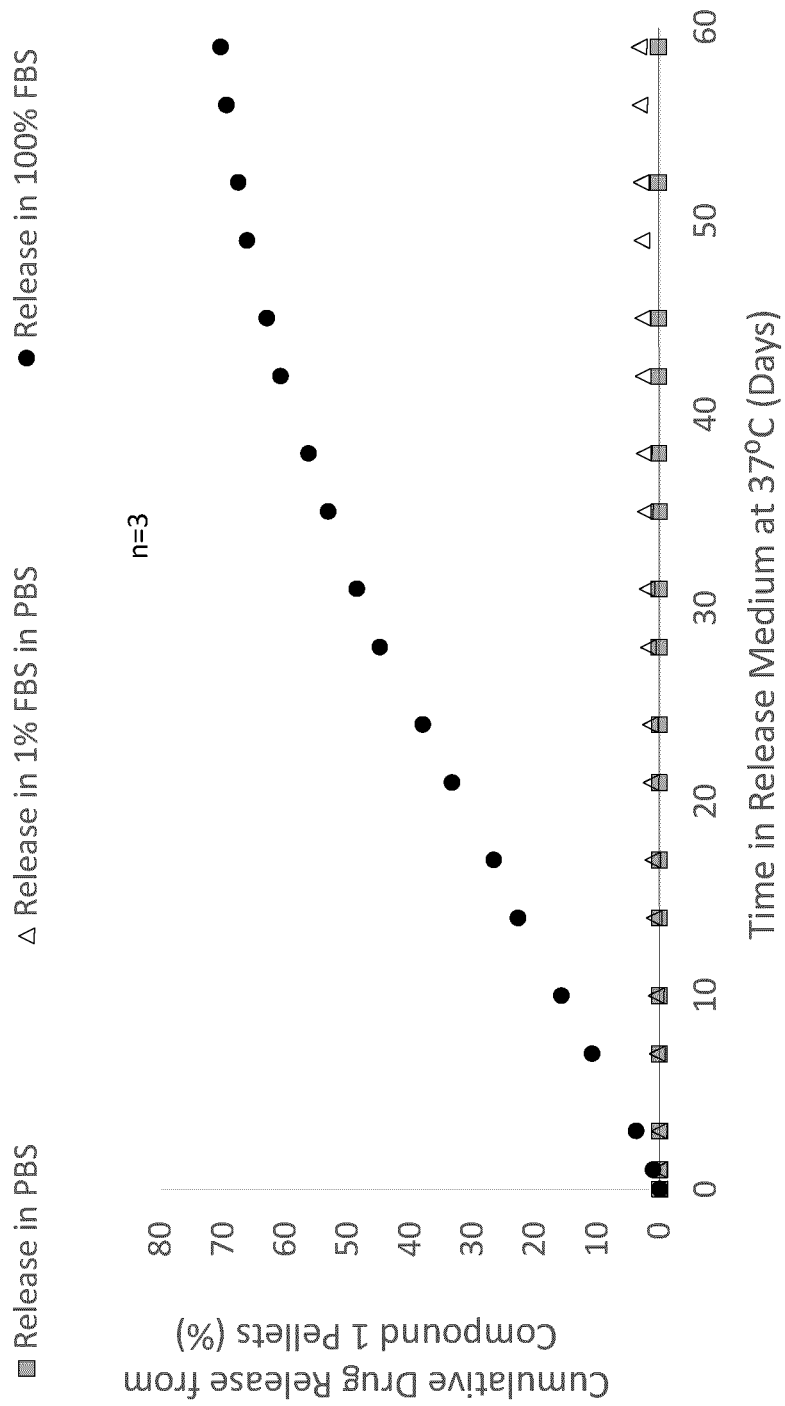

CRYSTALLINE FORMS OF DEXAMETHASONE DIMERS AND USES THEREOF

BACKGROUND OF THE DISCLOSURE

Dexamethasone is a useful drug in a variety of medical fields, for example in the treatment of inflammatory diseases or conditions and in reducing inflammation associated with surgery or another therapy.

SUMMARY OF THE DISCLOSURE

The disclosure features crystalline forms of Compound 1 (a dexamethasone prodrug dimer) and articles formed from the crystalline forms. The articles of the disclosure can be machined, molded, emulsion-processed, electrospun, electrosprayed, blow molded, or extruded to form a fiber, fiber mesh, woven fabric, non-woven fabric, pellet, cylinder, microparticle (e.g., a microbead), nanoparticle (e.g., a nanobead), or any other type shaped article from which the dexamethasone prodrug dimer is released in a controlled fashion. Alternatively, the crystalline forms can be included in pharmaceutical compositions formulated for administration to a subject (e.g., oral dosage forms or injectable dosage forms).

In a first aspect, the invention features a solid crystalline form of Compound 1 (Form I) characterized by a powder X-ray diffraction (PXRD) diffractogram (Cu, $\lambda$=1.54060) including peaks expressed in degrees $2\theta$ ($\pm 0.2°$) at: 3.8°, 7.6°, and 12.1°. In particular embodiments, the solid crystalline form is further characterized by a PXRD diffractogram obtained using Cu($\lambda$=1.54 Å) radiation including one, two, three, or more peaks expressed in degrees $2\theta$ ($\pm 0.2°$) at: 8.7°, 9.7°, 10.6°, 13.3°, and 14.6°. In particular embodiments, the solid crystalline form has a melting point of 159±2.5° C.

In another aspect, the invention features a solid crystalline form of Compound 1 (Form II) characterized by a powder X-ray diffraction (PXRD) diffractogram obtained using Cu($\lambda$=1.54 Å) radiation including peaks expressed in degrees $2\theta$ ($\pm 0.2°$) at: 3.9°, 7.9°, 11.9°, and 15.8°. In particular embodiments, the solid crystalline form is further characterized by a PXRD diffractogram obtained using Cu($\lambda$=1.54 Å) radiation including one, two, three, or more peaks expressed in degrees $2\theta$ ($\pm 0.2°$) at: 4.8°, 5.7°, 6.6°, 8.6°, 9.7°, 13.4°, 14.5°, and 17.2°. In particular embodiments, the solid crystalline form has a melting point of 166±2.0° C.

In another aspect, the invention features a solid crystalline form of Compound 1 (Form III) characterized by a powder X-ray diffraction (PXRD) diffractogram obtained using Cu($\lambda$=1.54 Å) radiation including peaks expressed in degrees $2\theta$ ($\pm 0.2°$) at: 8.0°, 9.8°, 12.1°, and 13.8°. In particular embodiments, the solid crystalline form is further characterized by a PXRD diffractogram obtained using Cu($\lambda$=1.54 Å) radiation including one, two, three, or more peaks expressed in degrees $2\theta$ ($\pm 0.2°$) at: 3.9°, 15.0°, 16.1°, and 17.6°. In particular embodiments, the solid crystalline form has a melting point of 172±2.0° C.

In another aspect, the invention features a solid crystalline form of Compound 1 (Form IV) characterized by a powder X-ray diffraction (PXRD) diffractogram obtained using Cu($\lambda$=1.54 Å) radiation including peaks expressed in degrees $2\theta$ ($\pm 0.2°$) at: 8.9°, 11.4°, 14.1°, and 16.4°. In particular embodiments, the solid crystalline form is further characterized by a PXRD diffractogram obtained using Cu($\lambda$=1.54 Å) radiation including one, two, three, or more peaks expressed in degrees $2\theta$ ($\pm 0.2°$) at: 7.0°, 17.1°, 17.9°, 19.1°, 19.8°, and 20.3°. In particular embodiments, the solid crystalline form has a melting point of greater than 225° C., and a decomposition point of 225±2.0° C.

In another aspect, the invention features a solid crystalline form of Compound 1 (Form V) characterized by a powder X-ray diffraction (PXRD) diffractogram obtained using Cu($\lambda$=1.54 Å) radiation including peaks expressed in degrees $2\theta$ ($\pm 0.2°$) at: 5.6°, 6.5°, 8.1°, 12.7°, and 15.2°. In particular embodiments, the solid crystalline form is further characterized by a PXRD diffractogram obtained using Cu($\lambda$=1.54 Å) radiation including one, two, three, or more peaks expressed in degrees $2\theta$ ($\pm 0.2°$) at: 10.3°, 11.3°, 11.8°, 14.5°, and 17.3°. In particular embodiments, the solid crystalline form has a melting point of 206±4.0° C.

In another aspect, the invention features a solid crystalline form of Compound 1 (Form VI) characterized by a powder X-ray diffraction (PXRD) diffractogram obtained using Cu($\lambda$=1.54 Å) radiation including peaks expressed in degrees $2\theta$ ($\pm 0.2°$) at: 3.7°, 7.4°, and 16.7°. In particular embodiments, the solid crystalline form is further characterized by a PXRD diffractogram obtained using Cu($\lambda$=1.54 Å) radiation including one, two, three, or more peaks expressed in degrees $2\theta$ ($\pm 0.2°$) at: 9.9°, 11.1°, 13.2°, and 14.8°. In particular embodiments, the solid crystalline form has a melting point of 152±4.0° C.

In another aspect, the invention features a solid crystalline form of Compound 1 (Form VII) characterized by a powder X-ray diffraction (PXRD) diffractogram obtained using Cu($\lambda$=1.54 Å) radiation including peaks expressed in degrees $2\theta$ ($\pm 0.2°$) at: 3.5°, 7.6°, 9.6°, and 10.7°. In particular embodiments, the solid crystalline form is further characterized by a PXRD diffractogram obtained using Cu($\lambda$=1.54 Å) radiation including one, two, three, or more peaks expressed in degrees $2\theta$ ($\pm 0.2°$) at: 7.1°, 12.7°, 14.5°, and 15.2°. In particular embodiments, the solid crystalline form has a melting point of 152±3.0° C.

In another aspect, the invention features a solid crystalline form of Compound 1 (Form VIII) characterized by a powder X-ray diffraction (PXRD) diffractogram obtained using Cu($\lambda$=1.54 Å) radiation including peaks expressed in degrees $2\theta$ ($\pm 0.2°$) at: 7.2°, 9.3°, 11.9°, 14.6°, and 17.0°. In particular embodiments, the solid crystalline form is further characterized by a PXRD diffractogram obtained using Cu($\lambda$=1.54 Å) radiation including one, two, three, or more peaks expressed in degrees $2\theta$ ($\pm 0.2°$) at: 6.7°, 15.9°, 18.0°, and 18.6°.

In a related aspect, the invention features a pharmaceutical composition including a solid crystalline form of the invention and a pharmaceutically acceptable excipient. In particular embodiments, the pharmaceutical composition is formulated for oral administration, e.g., as a tablet or capsule. In other embodiments, the crystals are suspended in a solution for injection into a site on a subject (e.g., injection into a joint space). The pharmaceutically acceptable excipients used in the pharmaceutical composition can be any of those described herein.

The invention features a method for making an article including Compound 1, the method including (a) heating a solid crystalline form of the invention to form a melt; and (b) heat molding the melt to form the article.

The invention further features a method for making an article including Compound 1, the method including (a) heating a solid crystalline form of the invention to form a melt; and (b) injection molding the melt to form the article.

The invention features a method for making an article including Compound 1, the method including (a) heating a solid crystalline form of the invention to form a melt; and (b) blow molding the melt to form the article.

The invention further features a method for making an article including Compound 1, the method including (a) dissolving a solid crystalline form of the invention to form a solution; and (b) evaporating the solvent to form the article.

The invention features a method for making an article including Compound 1, the method including (a) dissolving a solid crystalline form of the invention to form a solution; and (b) electrospinning or electrospraying the solution to form the article.

The invention further features a method for making an article including Compound 1, the method including (a) heating a solid crystalline form of the invention to form a melt; and (b) electrospinning or electrospraying the melt to form the article.

The invention features a method for making an article including Compound 1, the method including (a) heating a solid crystalline form of the invention to form a melt; and (b) extruding the melt to form the article.

In some embodiments of the above methods, dexamethasone is released from the article through surface erosion.

In some embodiments of the above methods, the article releases less than 10% of dexamethasone, as a percentage of the total dexamethasone present in the article in prodrug form, at 37° C. in 100% bovine serum over 5 days; or the surface erosion releases less than 2% of dexamethasone, as a percentage of the total dexamethasone present in the article in prodrug form, at 37° C. in PBS over 5 days; or the surface erosion releases greater than 20% of dexamethasone, as a percentage of the total dexamethasone present in the article in prodrug form, at 37° C. in 100% bovine serum over not fewer than 6 days; or the surface erosion releases greater than 5.0% of dexamethasone as a percentage of the total dexamethasone present in the article in prodrug form, at 37° C. in PBS over not fewer than 6 days; or dexamethasone is released from the article at a rate such that $t_{10}$ is greater than or equal to $\frac{1}{10}$ of $t_{50}$.

In some embodiments of the above methods, the article further includes from 0.1% to 10% (w/w) of one or more additives, wherein the one or more additives are selected from plasticizers, antioxidants, binders, lubricants, radio-opaque agents, and mixtures thereof.

In further embodiments of the above methods, the article is in the form of a coating, film, fiber, fiber mesh, woven fabric, non-woven fabric, pellet, cylinder, hollow tube, microparticle, nanoparticle, or shaped article. In other embodiments, the article is free of controlled release excipient, free of a crystallization inhibiting excipient, free of a mechanical integrity enhancing excipient, and/or free of a binding excipient. In some embodiments, the article is in a glassy state.

In certain embodiments of the above methods, the controlled release is provided by any one of: dimensions of the article, composition of the article, crystallinity of the article, surface area of the article, or combinations thereof.

In some embodiments of the above methods, at least 70% (e.g., at least 75%, at least 80%, at least 85%, at least 90%, at least 95%, or at least 99%) (w/w) of the article is Compound 1.

In further embodiments of the above methods, Compound 1 or dexamethasone is released from the article through surface erosion. In some embodiments, the surface erosion releases less than 10% (e.g., less than 9%, less than 8%, less than 7%, less than 6%, less than 5%, less than 4%, less than 3%, less than 2%, or less than 1%) of dexamethasone, as a percentage of the total drug, dexamethasone, present in the article in prodrug form, at 37° C. in 100% bovine serum over 5 days; or the surface erosion releases less than 2% (e.g., less than 1.8%, less than 1.5%, less than 1.2%, less than 1.0%, or less than 0.5%) of dexamethasone, as a percentage of the total drug, dexamethasone, present in the article in prodrug form, at 37° C. in PBS over 5 days. In still other embodiments of any of the above articles, the surface erosion releases greater than 20% (e.g., greater than 22%, 24%, 26%, 28%, or 30%) of dexamethasone (as a percentage of the total dexamethasone present in the article in prodrug form) at 37° C. in 100% bovine serum over not fewer than 6 days, 8 days, 10 days, or 12 days (e.g., greater than 24% of dexamethasone at 37° C. in 100% bovine serum over 10 days). In other embodiments of any of the above articles, the surface erosion releases greater than 5.0% (e.g., greater than 6.0%, 8.0%, 10%, 12%, or 15%) of dexamethasone (as a percentage of the total dexamethasone present in the article in prodrug form) at 37° C. in PBS over not fewer than 6 days, 8 days, 10 days, or 12 days (e.g., greater than 5% of dexamethasone at 37° C. in PBS over 10 days). The dexamethasone can be released from the article at a rate such that $t_{10}$ is greater than or equal to $\frac{1}{10}$ of $t_{50}$. In some embodiments, the article further includes from 0.1% to 10% (e.g., from 0.1 to 5%, from 0.1 to 2%, from 0.5 to 2%, from 1 to 10%) (w/w) of one or more additives, wherein the one or more additives are selected from plasticizers, antioxidants, binders, lubricants, radio-opaque agents, and mixtures thereof.

In some embodiments of the above methods, the article is in the form of fibers having a mean diameter of from about 0.01 to 1 mm (e.g., 0.05 to 0.3 mm, 0.1 to 0.3 mm, 0.15 to 0.3 mm, 0.2 to 0.3 mm, 0.25 to 0.3 mm, 0.01 to 0.1 mm, 0.01 to 0.2 mm, 0.01 to 0.3 mm, 0.01 to 0.4 mm, 0.01 to 0.5 mm, 0.01 to 0.6 mm, 0.01 to 0.7 mm, 0.01 to 0.8 mm, or 0.01 to 0.9 mm). In other embodiments, the article is in the form of pellets having a mean diameter of from about 0.2 to 5 mm (e.g., from about 0.2 to 1 mm, from about 0.2 to 2 mm, from about 0.3 to 3 mm, from about 1.5 to 5 mm, from about 2 to 5 mm, from about 2.5 to 5 mm, from about 3 to 5 mm, from about 3.5 to 5 mm, from about 4 to 5 mm, or from about 4.5 to 5 mm). In further embodiments, the article is in the form of cylinders of from about 0.01 to 1 mm in diameter (e.g., about 0.01 to 0.2 mm, about 0.1 to 0.3 mm, about 0.1 to 0.4 mm, about 0.2 to 0.5 mm, about 0.1 to 0.6 mm, about 0.1 to 0.7 mm, about 0.1 to 0.8 mm, or about 0.1 to 0.9 mm) and 0.5 to 20 mm in length (e.g., about to 0.5 to 1 mm, about 0.5 to 2 mm, about 0.5 to 4 mm, about 0.5 to 6 mm, about 0.5 to 8 mm, about 0.5 to 10 mm, about 0.5 to 12 mm, about 0.5 to 14 mm, about 0.5 to 16 mm, or about 0.5 to 18 mm). In some embodiments, the length of the cylinder is about 0.5 to 10 mm, or about 1 to 10 mm. In other embodiments, the article is in the form of microparticles having a mean diameter of from about 1 to 1000 μm (e.g., about 10 to 1000 μm, about 100 to 1000 μm, about 200 to 1000 μm, about 500 to 1000 μm, about 700 to 1000 μm, or about 900 to 1000 μm). In still other embodiments, the article is in the form of nanoparticles having a mean diameter of from about 0.01 to 1 μm (about 0.05 to 1 μm, about 0.1 to 1 μm, about 0.2 to 1 μm, about 0.3 to 1 μm, about 0.4 to 1 μm, about 0.5 to 1 μm, about 0.6 to 1 μm, about 0.7 to 1 μm, about 0.8 to 1 μm, or about 0.9 to 1 μm).

In some embodiments of the above methods, the article is a coating that resides on the surface of an implantable medical device. In further embodiments of the above methods, the coating has a glassy state and is formed from a crystal form of the disclosure.

The crystal forms of the invention can be useful as starting materials in the manufacture of articles. The articles can be formed by a process including the steps of: (a) heating the crystal form to form a melt; (b) cooling the melt to form a glassy state composition; and (c) heating the glassy state composition to a temperature above the glass transition temperature of the glassy state composition and shaping the glassy state composition to form a shaped article. Step (c) can include extruding, molding, blow molding, heat spinning, electrospinning, or electrospraying the glassy state composition to form the shaped article. In some embodiments, the method forms an article free of controlled release polymer, free of a crystallization inhibiting excipient, free of a mechanical integrity enhancing excipient, and/or free of a binding excipient; or the method forms an article that optionally has a glassy state. In further embodiments of the methods, the article is in the form of a coating, film, fiber, fiber mesh, woven fabric, non-woven fabric, pellet, cylinder, hollow tube, microparticle, nanoparticle, or shaped article.

In another embodiment of any of the above methods, the article includes a solid crystalline form of the invention. In particular embodiments, the article is a microparticle or nanoparticle.

In a related aspect, the invention features a method of treating a subject suffering from an inflammatory condition, the method comprising administering to the subject a composition comprising the solid crystalline form of the invention. The inflammatory condition is osteoarthritis, or any other inflammatory condition described herein. In particular embodiments, the administering is by intraarticular injection.

In a related aspect, the invention features a microparticle or nanoparticle including a solid crystalline form of the invention. In particular embodiments, the microparticle or nanoparticle is formulated for oral administration, e.g., as a tablet or capsule containing the microparticles or nanoparticles. In other embodiments, the microparticles or nanoparticles are suspended in a solution for injection into a site on a subject (e.g., injection into a joint space).

Definitions

The term "Compound 1," as used herein, refers to the compound depicted below in Formula (I):

The term "free of controlled release polymer," as used herein, refers to the absence of an amount of a polymeric material of greater than 10 KDa in the articles produced by the methods of the disclosure that is sufficient to delay or slow the release of the dexamethasone prodrug dimer from the article in comparison to the release profile observed for an otherwise identical article containing none of the polymeric material, where the release profile is measured at 37° C. in 100% fetal bovine serum (FBS). The term "free of a crystallization inhibiting excipient," as used herein, refers to the absence of an amount of an excipient in the articles produced by the methods of the disclosure that is sufficient to reduce the amount of crystalline dexamethasone prodrug dimer in the article in comparison to the amount of crystalline dexamethasone prodrug dimer observed in an otherwise identical article containing none of the excipient. The level of crystallinity can be measured using DSC or XRD. In particular embodiments, the articles of the disclosure are free of a crystallization inhibiting excipient that is a polymeric material of greater than 10 KDa.

The term "free of a mechanical integrity enhancing excipient," as used herein, refers to the absence of an amount of an excipient in the articles produced by the methods of the disclosure that is sufficient to increase the mechanical integrity of the article in comparison to the mechanical integrity of an otherwise identical article containing none of the excipient. The mechanical integrity of an article can be tested using a 3- or 4-point mechanical bend test (ASTM C1684-18) on the formulation with or without the excipient with the article in the shape of a rod either in the dry state (prior to drug release), wet state (prior to drug release), or in the wet state after 15-30% drug release. For articles with a rectangular shape, the mechanical integrity can be tested using a 3-point mechanical bend test (ASTM D790-17) or 4-point mechanical bend test (ASTM D6272) on the formulation with or without excipient either in the dry state (prior to drug release), wet state (prior to drug release), or in the wet state after 15-30% drug release. A reduction in mechanical integrity causes the articles to break apart sooner, increasing the total surface area of the quantity of articles, and resulting in a more rapid release profile. In particular embodiments, the articles of the disclosure are free of a mechanical integrity enhancing excipient that is a polymeric material of greater than 10 KDa.

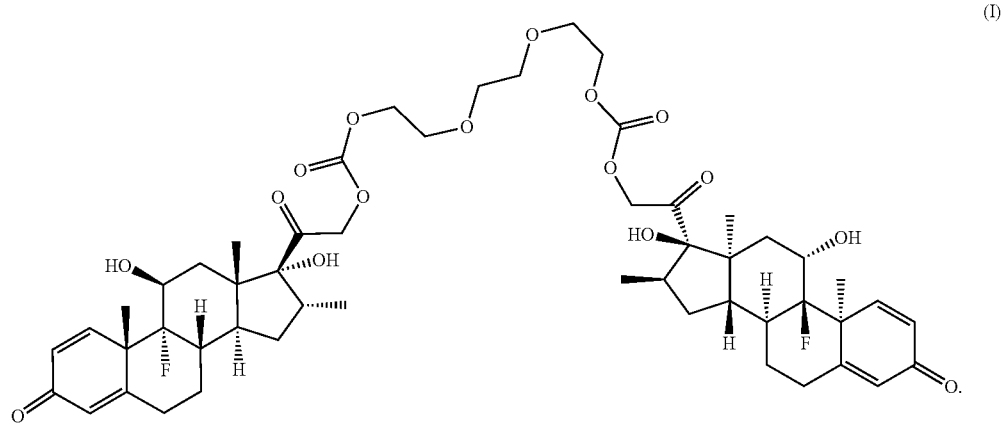

(I)

The term "free of a binding excipient," as used herein, refers to the absence of an amount of an excipient in the articles produced by the methods of the disclosure that is sufficient to delay or slow the release of the dexamethasone prodrug dimer from the article in comparison to the release profile observed for an otherwise identical article containing none of the binding excipient, where the release profile is measured at 37° C. in 100% FBS.

The term "cylinder," as used herein, refers to the shape of the pharmaceutical compositions of the disclosure that has parallel sides and a circular or oval cross section, or a shaped cross section (e.g., a star shaped cross section). A mean diameter of the cylinder can range from about 0.01 to 1 mm diameter, e.g., about 0.01 to 0.2 mm, about 0.1 to 0.3 mm, about 0.1 to 0.4 mm, about 0.2 to 0.5 mm, about 0.1 to 0.6 mm, about 0.1 to 0.7 mm, about 0.1 to 0.8 mm, or about 0.1 to 0.9 mm. A mean length of the cylinder can range from about 0.05 to 20 mm, e.g., about 0.05 to 1 mm, about 0.5 to 2 mm, about 0.5 to 4 mm, about 0.5 to 6 mm, about 0.5 to 8 mm, about 0.5 to 10 mm, about 0.5 to 12 mm, about 0.5 to 14 mm, about 0.5 to 16 mm, or about 0.5 to 18 mm. In some embodiments, the mean diameter of the cylinder is in the range of about 0.01 to 1 mm and the mean length of the cylinder is about 0.1 mm to 4.0 mm. In some embodiments, the mean length of the cylinder is about 0.5 to 10 mm, or about 1 to 10 mm.

The term "fiber," as used herein, refers to the shape of the pharmaceutical compositions of the disclosure that is elongated or threadlike. A mean diameter of the fiber can range from about 0.01 to 1 mm, e.g., 0.05 to 0.3 mm, 0.1 to 0.3 mm, 0.15 to 0.3 mm, 0.2 to 0.3 mm, 0.25 to 0.3 mm, 0.01 to 0.1 mm, 0.01 to 0.2 mm, 0.01 to 0.3 mm, 0.01 to 0.4 mm, 0.01 to 0.5 mm, 0.01 to 0.6 mm, 0.01 to 0.7 mm, 0.01 to 0.8 mm, or 0.01 to 0.9 mm. A mean length of the fiber can range from about 20 to 20,000 mm, e.g., about 20 to 1000 mm, about 20 to 2,000 mm, about 100 to 2,000 mm, about 100 to 5,000 mm, about 1,000 to 8,000 mm, about 2,000 to 8,000 mm, about 2,000 to 10,000 mm, about 2,000 to 12,000 mm, about 2,000 to 15,000 mm, or about 5,000 to 18,000 mm.

The term "fiber mesh," as used herein refers to a web or a net in having many attached or woven fibers. The fiber mesh can have aligned and unaligned morphologies.

The term "glassy state," as used herein, refers to an amorphous solid including greater than 70%, 80%, 90%, 95%, 98%, or 99% (w/w) of Compound 1 and exhibiting a glass transition temperature above 38° C. In the glassy state, as measured by DSC or XRD, the level of crystallinity is low, ranging from 0-15%, e.g., 0-1%, 0-3%, 0-5%, 0-7%, 0-9%, 0-10%, or 0-13%. Glass formulations of the disclosure can be formed using heat processing or solvent processing one or more crystal forms of the invention.

The term "microparticle," as used herein, refers to the shape of the pharmaceutical compositions of the disclosure, which can be regularly or irregularly shaped. A mean diameter of the microparticle can range from about 1 to 1000 µm, e.g., about 10 to 1000 µm, about 100 to 1000 µm, about 200 to 1000 µm, about 500 to 1000 µm, about 700 to 1000 µm, or about 900 to 1000 µm. As used herein, a microbead is a microparticle that is spherical.

The term "nanoparticle," as used herein, refers to the shape of the pharmaceutical compositions of the disclosure, which can be regularly or irregularly shaped. A mean diameter of the nanoparticle can range from about 0.01 to 1 µm, e.g., about 0.05 to 1 µm, about 0.1 to 1 µm, about 0.2 to 1 µm, about 0.3 to 1 µm, about 0.4 to 1 µm, about 0.5 to 1 µm, about 0.6 to 1 µm, about 0.7 to 1 µm, about 0.8 to 1 µm, or about 0.9 to 1 µm. As used herein, a "nanobead" refers to a nanoparticle that is spherical.

The term "non-woven fabric," as used herein, refers to a web structure bonded together by entangling fibers.

The term "pellet," as used herein, refers to the shape of the pharmaceutical compositions of the disclosure that is rounded, spherical, or cylindrical, or a combination thereof. A mean diameter of the pellet can range from about 0.2 to 5 mm, e.g., from about 0.2 to 1 mm, from about 0.2 to 2 mm, from about 0.3 to 3 mm, from about 1.5 to 5 mm, from about 2 to 5 mm, from about 2.5 to 5 mm, from about 3 to 5 mm, from about 3.5 to 5 mm, from about 4 to 5 mm, or from about 4.5 to 5 mm.

The term "surface erosion," as used herein refers to a process of a gradual disintegration of the pharmaceutical compositions of the disclosure and release of a free drug from the dexamethasone prodrug dimer. Surface erosion can be tailored to achieve desired drug release rates. The rate of surface erosion and release of a given drug from a dexamethasone prodrug dimer may also depend on the quantity of the loaded dexamethasone prodrug dimer as a percent of the final dexamethasone prodrug dimer formulation, article size, solubility of dexamethasone prodrug dimer (e.g., through selection of appropriate linker), and/or surface area of the article. For example, surface erosion mechanism of drug release allows drug delivery articles to be tailored with specific physical features (dimensions, diameters, surface areas, total mass, etc.) to achieve desired drug release rates, and drug release may be designed to be initiated within minutes or hours, and may continue to occur over days, weeks, months, or years.

As used herein, "$t_{50}$" is the time at which 50% of the releasable drug has been released from an article of the disclosure. Time $t_{10}$ is, correspondingly, the time at which 10% of the releasable drug has been released from an article of the disclosure. When the release curve is perfectly linear, $t_{10}=1/5$ of $t_{50}$. When there is an initial burst of released drug, $t_{10}$ is much less than ⅕ of $t_{50}$. In the compositions and methods of the disclosure $t_{10}$ can be equal to or greater than ¹⁄₁₀ of $t_{50}$. Drug release from an article or compound of the disclosure can be measured at 37° C. in 100% bovine serum, or at 37° C. in PBS, as described in Example 1.

The term "woven fabric," as used herein, refers to pharmaceutical compositions that resemble materials that are formed by weaving of fibers.

BRIEF DESCRIPTION OF THE DRAWINGS

FIG. 1C is a Results of powder X-ray diffraction (PXRD) (FIG. 1C) for Compound 1 crystallized from acetonitrile as described in Example 1 (Form III).

FIG. 2 is a graph depicting the release of Compound 1 from the glassy pellets over time.

DETAILED DESCRIPTION OF THE DISCLOSURE

Figure 1B:
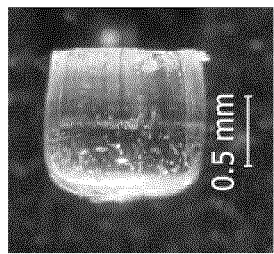
FIGS. 1A-1C are a series of images and graphs showing Compound 1 (dexamethasone-triethylene glycol-dexamethasone, Dex-TEG-Dex) (FIG. 1A) formed into pellets (FIG. 1B) in the glassy state.
Figure 1A:
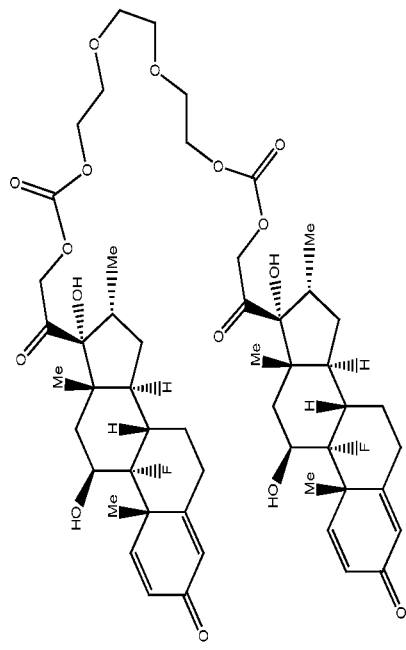

While the clinical importance of sustained drug release delivery systems to maintain therapeutic concentration of drugs for extended periods of time (e.g., days to weeks, to months or even years) has been well acknowledged for decades, there has been a limited number of successfully commercialized products on the market to date. It is recognized in this disclosure that to develop successful sustained drug delivery systems, technical difficulties must be overcome ranging from drug degradation during formulation process; lack of controlled release, including unwanted burst or incomplete release associated with diffusion or bulk erosion mechanisms of drug release; low encapsulation efficiency; and formulation complexity.

For locally administered sustained release delivery systems, it is recognized in this disclosure that additional challenges can arise where the mass balance of the carrier or matrix for the drug hinders drug loading, or where the carriers and matrices produce unwanted effects (i.e., such as local inflammation). It is recognized in this disclosure that there is an unmet need for a sustained release drug system that is formulated to release dexamethasone via a surface erosion process in the absence or with a minimal amount of carrier and/or excipient agents, at a rate-controlled manner over an extended period of time (e.g., days to weeks, to months or even years), where the system contains predominantly dexamethasone prodrug and minimizes side effects associated with the use of carriers or matrices.

This disclosure describes crystal forms of a dexamethasone prodrug dimer that can be used to form pharmaceutical compositions that are produced from viscous fluids, such as a melt or solution, in order yield shaped articles where most of the material is in a glassy state. The shaped articles can have the ability to release their prodrug/drug elements from these shaped forms upon surface mediated degradation/dissolution. This can provide a controlled rate of drug release over days, weeks, months, or years, due to unique interactions between the molecules that exist in a mostly amorphous state while holding the shaped form intact as the surface erodes. Articles formed from the crystal forms of the disclosure can yield sustained and uniform release of the dexamethasone prodrugs, without exhibiting any burst release (e.g., $t_{10}$ can be equal to or greater than $\frac{1}{10}$ of $t_{50}$) and without reliance upon degradable matrices, which can cause undesirable local side effects (such as inflammation). The high drug loading that can be present in the articles of the disclosure are suitable for producing locally effective concentrations of a dexamethasone for periods of days to weeks to months or even years.

Alternatively, the crystal forms of the disclosure can be incorporated into pharmaceutical compositions for administration to a subject (e.g., for the treatment of inflammation)
.

The advantages associated with the use of the crystal forms of the invention can include: (i) increased storage stability that can produce longer drug substance shelf life; (ii) increased thermal stability to permit high temperature processing with little or no discernable degradation; (iii) modified release profiles for scenarios where the crystal form is present in the final drug product as administered; (iv) decreased melting point to allow thermal processing at lower temperatures; (v) increased solubility in a preferred solvent (e.g. class 3 solvents, low boiling point solvent to get low residual solvent in final product); (vi) decreased hygroscopicity; (vii) ease of manufacturing/generating crystals/particles in the appropriate size for retention in local tissue; and (viii) sufficient mechanical properties allowing resuspension and administration without altering crystal/particle size.

Crystalline Formulations

The pharmaceutical compositions of the invention including a crystalline form of Compound 1 can include a pharmaceutically acceptable excipient, which, as used herein, includes any and all solvents, diluents, or other liquid vehicle, dispersion or suspension aids, surface active agents, isotonic agents, thickening or emulsifying agents, preservatives, solid binders, and lubricants, as suited to the particular dosage form desired. Remington's Pharmaceutical Sciences, Sixteenth Edition, E. W. Martin (Mack Publishing Co., Easton, Pa., 1980) discloses various excipients used in formulating pharmaceutical compositions and known techniques for the preparation thereof. Some examples of materials which can serve as pharmaceutically acceptable excipients include, but are not limited to, sugars such as lactose, glucose, mannitol, and sucrose; starches such as corn starch and potato starch; cellulose and its derivatives such as sodium carboxymethyl cellulose, ethyl cellulose and cellulose acetate; powdered tragacanth; malt; gelatine; talc; excipients such as cocoa butter and suppository waxes; oils such as peanut oil, cottonseed oil; safflower oil, sesame oil; olive oil; corn oil and soybean oil; glycols; such as propylene glycol; esters such as ethyl oleate and ethyl laurate; agar; natural and synthetic phospholipids, such as soybean and egg yolk phosphatides, lecithin, hydrogenated soy lecithin, dimyristoyl lecithin, dipalmitoyl lecithin, distearoyl lecithin, dioleoyl lecithin, hydroxylated lecithin, lysophosphatidylcholine, cardiolipin, sphingomyelin, phosphatidylcholine, phosphatidyl ethanolamine, diastearoyl phosphatidylethanolamine (DSPE) and its pegylated esters, such as DSPE-PEG750 and, DSPE-PEG2000, phosphatidic acid, phosphatidyl glycerol and phosphatidyl serine. Commercial grades of lecithin which are preferred include those which are available under the trade name Phosal® or Phospholipon® and include Phosal 53 MCT, Phosal 50 PG, Phosal 75 SA, Phospholipon 90H, Phospholipon 90G and Phospholipon 90 NG; soy-phosphatidylcholine (SoyPC) and DSPE-PEG2000 are particularly preferred; buffering agents such as magnesium hydroxide and aluminum hydroxide; alginic acid; pyrogen-free water; isotonic saline; Ringer's solution; ethyl alcohol, and phosphate buffer solutions, as well as other non-toxic compatible lubricants such as sodium lauryl sulfate and magnesium stearate, as well as coloring agents, releasing agents, coating agents, sweetening, flavoring and perfuming agents, preservatives and antioxidants can also be present in the composition, according to the judgment of the formulator.

Non-limiting examples of binding agents that may be used in pharmaceutical compositions of the present invention include but are not limited to hydroxyalkyl cellulose, a hydroxyalkylalkyl cellulose, hydroxypropyl methyl cellulose, or a polyvinylpyrrolidone.

Non-limiting examples of osmotic agents that may be used in pharmaceutical compositions of the present invention include, but are not limited to, sorbitol, mannitol, sodium chloride, or other salts. Non-limiting examples of biocompatible polymers employed in the contemplated dosage forms include but are not limited to poly(hydroxy acids), polyanhydrides, polyorthoesters, polyamides, polycarbonates, polyalkylenes, polyalkylene glycols, polyalkylene oxides, polyalkylene terepthalates, polyvinyl alcohols, polyvinyl ethers, polyvinyl esters, polyvinyl halides, polyvinylpyrrolidone, polysiloxanes, poly(vinyl alcohols), poly(vinyl acetate), polystyrene, polyurethanes and co-polymers thereof, synthetic celluloses, polyacrylic acids, poly(butyric acid), poly(valeric acid), and poly(lactide-co-caprolactone), ethylene vinyl acetate, copolymers and blends thereof.

Non-limiting examples of hygroscopic polymers that may be employed in the contemplated dosage forms include, but are not limited to, polyethylene oxide (e.g., Polyox® with MWs from 4,000,000 to 10,000,000), cellulose, hydroxymethylcellulose, hydroxyethylcellulose, crosslinked polyacrylic acids, and xanthan gum.

Non-limiting examples of rate-controlling polymers the may be employed in the contemplated dosage forms include but are not limited to polymeric acrylate, methacrylate lacquer or mixtures thereof, polymeric acrylate lacquer, methacrylate lacquer, an acrylic resin including a copolymer of acrylic and methacrylic acid esters, or an ammonium methacrylate lacquer with a plasticizer.

The above-described compositions, in any of the forms described herein, can be used for treating disease (e.g., inflammatory disease, or any other disease or condition described herein). An effective amount refers to the amount of an active compound/agent that is required to confer a therapeutic effect on a treated subject. Effective doses will vary, as recognized by those skilled in the art, depending on the types of diseases treated, route of administration, excipient usage, and the possibility of co-usage with other therapeutic treatment.

A pharmaceutical composition of this invention can be administered by any suitable route, e.g., parenterally, orally, nasally, rectally, topically, buccally, by ophthalmic administration, or by inhalation. The term "parenteral" as used herein refers to subcutaneous, intracutaneous, intravenous, intramuscular, intraarticular, intraarterial, intrasynovial, intrasternal, intrathecal, intralesional, or intracranial injection.

A sterile injectable composition can be a suspension in a non-toxic parenterally acceptable diluent or solvent. Such diluents include, but are not limited to, 1,3-butanediol, mannitol, water, Ringer's solution, and isotonic sodium chloride solution. In addition, fixed oils are conventionally employed as a solvent or suspending medium (e.g., synthetic mono- or diglycerides). Fatty acids, such as, but not limited to, oleic acid and its glyceride derivatives, are useful in the preparation of injectables, as are natural pharmaceutically acceptable oils, such as, but not limited to, olive oil or castor oil, or polyoxyethylated versions thereof. These oil solutions or suspensions also can contain a long chain alcohol diluent or dispersant such as, but not limited to, carboxymethyl cellulose, or similar dispersing agents. Other commonly used surfactants, such as, but not limited to, Tweens or Spans or other similar emulsifying agents or bioavailability enhancers, which are commonly used in the manufacture of pharmaceutically acceptable solid, liquid, or other dosage forms also can be used for the purpose of formulation.

A composition for oral administration can be any orally acceptable dosage form including capsules, tablets, emulsions and aqueous suspensions, dispersions, and solutions. In some embodiments, the dosage form is an oral dosage form such as a pressed tablet, hard or soft gel capsule, enteric coated tablet, osmotic release capsule, or unique combination of excipients. In the case of tablets, commonly used excipients include, but are not limited to, lactose, mannitol, and corn starch. Lubricating agents, such as, but not limited to, magnesium stearate, also are typically added. For oral administration in a capsule form, useful diluents include, but are not limited to, lactose, mannitol, glucose, sucrose, corn starch, potato starch, or cellulose. In additional embodiments, the dosage form includes a capsule wherein the capsule contains a mixture of materials to provide a desired sustained release formulation. When aqueous suspensions or emulsions are administered orally, the active ingredient can be suspended or dissolved in an oily phase combined with emulsifying or suspending agents. If desired, certain sweetening, flavoring, or coloring agents can be added.

Pharmaceutical compositions for topical administration according to the described invention can be formulated as solutions, ointments, creams, suspensions, lotions, powders, pastes, gels, sprays, aerosols, or oils. Alternatively, topical formulations can be in the form of patches or dressings impregnated with active ingredient(s), which can optionally include one or more excipients or diluents. In some preferred embodiments, the topical formulations include a material that would enhance absorption or penetration of the Compound 1 through the skin or other affected areas.

A topical composition contains a safe and effective amount of a dermatologically acceptable excipient suitable for application to the skin. A "cosmetically acceptable" or "dermatologically-acceptable" composition or component refers a composition or component that is suitable for use in contact with human skin without undue toxicity, incompatibility, instability, or allergic response. The excipient enables an active agent and optional component to be delivered to the skin at an appropriate concentration(s). The excipient thus can act as a diluent, dispersant, solvent, or the like to ensure that the active materials are applied to and distributed evenly over the selected target at an appropriate concentration. The excipient can be solid, semi-solid, or liquid. The excipient can be in the form of a lotion, a cream, or a gel, in particular one that has a sufficient thickness or yield point to prevent the active materials from sedimenting. The excipient can be inert or possess dermatological benefits. It also should be physically and chemically compatible with the active components described herein, and should not unduly impair stability, efficacy, or other use benefits associated with the composition.

Article Formulations

The pharmaceutical compositions of the disclosure can include an article in the form of fibers, fiber meshes, woven fabrics, non-woven fabrics, pellets, cylinders, hollow tubes, microparticles (e.g., microbeads), nanoparticle (e.g., nanobeads), or other shaped articles. In some embodiments, the pharmaceutical composition of the disclosure has a non-circular shape that affects, e.g., increases, the surface area (e.g., extruded through star-shaped dye). Suitable pharmaceutical compositions for use with this disclosure can be small regularly or irregularly shaped particles, which can be solid, porous, or hollow.

Different forms of pharmaceutical compositions of the present disclosure (e.g., fibers, fiber meshes, woven fabrics, non-woven fabrics, pellets, cylinders, hollow tubes, microparticles (e.g., microbeads), nanoparticles (e.g., nanobeads), or other shaped articles) can have the advantages of providing a controllable surface area, being easily injected, not requiring removal after completion of drug release, and allow for tailoring drug release rates required for a given indication. When used as an injectable drug delivery device, drug release rate and interaction with cells are strongly dependent on the size distribution of the pharmaceutical composition form.

Article Processing Methods

Articles of the disclosure can be formed using any number of the methods, for example, heat processing or solvent processing of the crystal forms of the dexamethasone prodrug dimer Compound 1. Heat processing can include heat molding, injection molding, extrusion, 3D printing, melt electrospinning, fiber spinning, fiber extrusion, and/or blow molding. Solvent processing may include coating, micro printing, emulsion processing dot printing, micropatterning, fiber spinning, solvent blow molding, electrospraying, and electrospinning.

Electrospraying Method

In some embodiments, the crystal forms of the disclosure are dissolved in a solvent (e.g., acetone) at concentrations ranging from, e.g., 10-30% w/v, and are electrosprayed to form micro- and nanobeads. The solutions can be loaded into a syringe and can be injected at a particular rate, e.g., 0.5 mL/h, onto a stationary collection plate. Between the needle and collecting surface, a potential difference of, e.g., 18 kV, can be maintained. Exemplary concentration of 10% w/v is used to obtain nanoparticles. In other embodiments, a concentration of 30% w/v is used to obtain microbeads.

Fiber Spinning Methods

In some embodiments, the pharmaceutical compositions of the disclosure, e.g., fibrous meshes with aligned and unaligned morphologies are prepared by electrospinning. The crystal forms of the disclosure are dissolved in a solvent (e.g., THF, or 1:1 ratio of DCM/THF). The solutions may be injected from a syringe at a particular rate, e.g., 0.5 mL/h, onto a cylindrical mandrel rotating at a particular rotational speed, e.g., 1150 rpm, to obtain aligned fibers, or onto a stationary collector surface to obtain unaligned fibers. A potential difference (e.g., 18 kV or 17 kV) can be maintained between the needle and collecting surface for aligned and random fibers.

In other embodiments, fibers are prepared either from the melt at elevated temperatures, the glassy state intermediate, or from solution by dissolving the pharmaceutical compositions of the disclosure in a solvent (e.g., DCM, THF, or chloroform). As used herein, melt spinning describes heat processing from the melt state, heat spinning describes heat processing from the glassy state, and wet, dry, and gel spinning describe solution processing.

The viscous melt, intermediate, or solution can be fed through a spinneret and fibers may be formed upon cooling (melt or heat spinning) or following solvent evaporation with warm air as the Compound 1 exits the spinneret (dry spinning). Wet spinning and gel spinning, performed according to methods known in the art, may also be used to produce the fibers of the disclosure. Heat spinning describes a process that is essentially the same as the melt spinning process, but performed with the glassy state intermediate and heated above the glass transition temperature (Tg) to get the viscous fluid to extrude/spin instead of the melt. Alternatively, tweezers may be dipped into melted material or concentrated solutions and retracted slowly in order to pull fibers. The rate of pulling and distance pulled may be varied to yield fibers and columnar structures of different thickness.

Emulsion Method

In some embodiments, micro-particles or nano-particles made from the crystal forms can be formed using an emulsion process. The crystal form can be dissolved in an organic solvent (e.g., DCM, THF, etc.) and a surfactant (e.g., SDS, PVA, etc.) may be added to the solution/mixture at a low percentage (e.g., 1%). The resulting mixture may be stirred for the appropriate time at room temperature to form an emulsion. The emulsion may be subsequently added to Milli-Q water under stirring for an appropriate time (e.g., 1 h) to remove residual solvent. The resulting micro- or nano-particles may be collected by centrifugation and dried to obtain the desired form.

Extrusion Method

In some embodiments, injectable cylinders made from the crystal forms may be formed by heat extrusion. The crystal form can be loaded into a hot melt extruder, heated to a temperature above the melting point (for crystalline compositions) or glass transition temperature (for pre-melted or amorphous compositions), and extruded using a light compressive force to push the material through the nozzle and a light tensile force to pull the material out of the extruder. The extrudate may be cut to the desired length for appropriate drug dosing for the indication of interest.

Bead Sizing and Milling

In some embodiments, a milling process may be used to reduce the size of an article of the disclosure to form sized particles, e.g., beads, in the micrometer (microbeads) to nanometer size range (nanobeads). The milling process may be performed using a mill or other suitable apparatus. Dry and wet milling processes such as jet milling, cryo-milling, ball milling, media milling, sonication, and homogenization are known and can be used in methods described herein. Generally, in a wet milling process, a suspension of the material to be used as the core is agitated with or without excipients to reduce particle size. Dry milling is a process wherein the material to be used as the article core is mixed with milling media with or without excipients to reduce particle size. In a cyro-milling process, a suspension of the material to be used as the core is mixed with milling media with or without excipients under cooled temperatures. In some embodiments, subsequent heating of the milled microparticle above the Tg is needed to achieve a spherical shape, or particles with non-spherical shapes can be used as milled.

Low Temperature Processing Using Intermediate Glassy State Articles

In certain embodiments, the dexamethasone prodrug dimer has a limited window (e.g., short timeframe of seconds to minutes) of thermal stability, whereby the purity of the dimer is minimally affected at elevated temperatures. In some embodiments, it is beneficial to make an intermediate glassy state form (e.g., film, pellet, micro-particles, or other shaped article). This can be accomplished by heat or solvent processing to remove or reduce the crystallinity of the material to form a glassy state composition. The glassy state composition is subsequently heat processed at a lower temperature (e.g., processing just above the glass transition temperature (Tg), and below the melt temperature (Tm)). This can provide a longer timeframe for heat processing the glassy state material into the final shaped article, while reducing the impact of processing conditions on the purity of the dexamethasone prodrug dimer in the article.

Exemplary processing details are provided in the Examples.

Powder X-Ray Diffraction (PXRD) Methods

Depending on the method in which the embodiments of the invention are prepared, the methodology and instrument used for PXRD analysis, and the scale selected to display results, the intensity of a given peak observed in the PXRD diffractogram may vary when compared to the same peak in the representative PXRD diffractograms provided in FIGS. 1C-11 to illustrate the embodiments of the invention provided herein. Thus, differences in relative peak intensities between peaks in a PXRD diffractogram for a given crystalline form may be observed when compared to the relative peak intensities of the peaks in the representative PXRD diffractograms of FIGS. 1C-11. Any such differences may be due, in part, to the preferred orientation of the sample and its deviation from the ideal random sample orientation, the preparation of the sample for analysis, and the methodology applied for the analysis. Such variations are known and understood by a person of skill in the art, and any such variations do not depart from the invention disclosed herein.

In addition to the differences in relative peak intensities that may be observed in comparison to the representative PXRD diffractograms provided in FIGS. 1C-11, it is understood that individual peak positions may vary between ±0.2° 2θ from the values observed in the representative PXRD diffractograms provided in FIGS. 1C-11 for the crystalline forms of the invention, or tabulated in the Examples. Such variations are known and understood by a person of skill in the art, and any such variations do not depart from the invention disclosed herein.

Further, it is understood that, depending on the instrument used for X-ray analysis and its calibration, uniform offsets in the peak position of each peak in a PXRD diffractogram of greater than 0.2° 2θ may be observed when compared to the representative PXRD diffractograms provided in FIGS. 1C-11. Thus, PXRD diffractograms of the crystalline forms of the present invention may, in some circumstances, display the same relative peak positions as observed in the representative PXRD diffractograms provided in FIGS. 1C-11, with the exception that each peak is offset in the same direction, and by approximately the same amount, such that the overall PXRD diffractogram is substantially the same in appearance as a PXRD diffractogram of FIGS. 1C-11, with the exception of the uniform offset in peak positions. The observation of any such uniform peak shift in a PXRD diffractogram does not depart from the invention disclosed herein given that the relative peak positions of the individual peaks within the PXRD diffractogram remain consistent with the relative peak positions observed in the PXRD diffractograms of FIGS. 1C-11 for the crystalline forms of the invention.

As used herein, the term 'crystalline form' refers to a substance with a particular arrangement of molecular components in its crystal lattice, and which may be identified by physical characterization methods such as PXRD. As used herein, the term crystalline form is intended to include single-component and multiple-component crystalline forms of Compound 1. Single-component forms of Compound 1 consist solely of Compound 1 in the repeating unit of the crystal lattice. Multiple-component forms of Compound 1 include solvates of Compound 1 wherein a solvent is also incorporated into the crystal lattice.

Drug Delivery

The pharmaceutical compositions of the disclosure provide optimal delivery of dexamethasone as they release the dexamethasone from an article of the disclosure in a controlled manner, for example, by surface erosion. The surface erosion mechanism of drug release may allow the shaped article to maintain its physical form (e.g. shape/geometry of the article), while gradually decreasing in size as the surface erodes (e.g., like a bar of soap), rather than bulk erosion that is characteristic of some polymer-based drug release vehicles (e.g. polylactic/glycolic acid). This may inhibit burst release and reduce the formation of inflammatory particulates. The drug can be controlled to be delivered over a desired period of time. A slower and steadier rate of delivery may in turn result in a reduction in the frequency with which the pharmaceutical composition must be administered to a subject, and improve the safety profile of the drug. Drug release can also be tailored to avoid side effects of slower and longer release of the drug by engineering the article to provide steady release over a comparatively shorter period of time.

The rate of release of a given drug from the pharmaceutical composition may also depend on the quantity of the loaded drug dimer as a percent of the final drug dimer formulation, e.g., by using a pharmaceutical excipient that acts as a bulking agent. Another factor that can affect the release rate of a drug from, for example a microbead, is the microbead size. In some embodiments, drug release is affected by changes in surface area of the formulation, e.g., by changing the diameter of the microbeads. By adjusting the vide supra factors, dissolution, degradation, diffusion, and controlled release may be varied over wide ranges. For example, release may be designed to be initiated over minutes to hours, and may extend over the course of days, weeks, months, or years.

Uses and Pharmaceutical Compositions

In some embodiments, the crystal forms of the disclosure are used to prepare a drug delivery device (or, e.g., a drug depot) with a minimal need for additives. This may achieve a local, sustained release and a local biological effect, while minimizing a systemic response. In some embodiments, when present, the additives are in small amounts and do not affect the physical or bulk properties. In some embodiments, when present, the additives do not alter the drug release properties from the pharmaceutical composition but rather act to improve processing of the prodrug dimer into the shaped article. In some embodiments, the pharmaceutical compositions contain additives such as a plasticizer (e.g., to reduce thermal transition temperatures), an antioxidant (e.g., to increase stability during heat processing), a binder (e.g., to add flexibility to the fibers), a bulking agent (e.g., to reduce total drug content), a lubricant, a radio-opaque agent, or mixtures thereof. The additives may be present at 30% (w/w), e.g., 20% (w/w), 10% (w/w), 7% (w/w), 5% (w/w), 3% (w/w), 1% (w/w), 0.5% (w/w), or 0.1% (w/w). Examples of plasticizers are polyols, e.g., glycerol, ethylene glycol, diethylene glycol, triethylene glycol, tetraethylene glycol, polyethylene glycol, propylene glycol, triacetin, sorbitol, mannitol, xylitol, fatty acids, monosaccharides (e.g., glucose, mannose, fructose, sucrose), ethanolamine, urea, triethanolamine, vegetable oils, lecithin, or waxes. Exemplary antioxidants are glutathione, ascorbic acid, cysteine, or tocopherol. The binders and bulking agents can be, e.g., polywinylpyrrolidone (PVP), starch paste, pregelatinized starch, hydroxypropyl methyl cellulose (HPMC), carboxymethyl cellulose (CMC), or polyethylene glycol (PEG) 6000.

Methods involving treating a subject may include preventing a disease, disorder or condition from occurring in the subject which may be predisposed to the disease, disorder and/or condition but has not yet been diagnosed as having it; inhibiting the disease, disorder or condition, e.g., impeding its progress; and relieving the disease, disorder, or condition, e.g., causing regression of the disease, disorder and/or condition. Treating the disease or condition includes ameliorating at least one symptom of the particular disease or condition, even if the underlying pathophysiology is not affected (e.g., such treating the pain of a subject by administration of an agent even though such agent does not treat the cause of the pain).

Pharmaceutical compositions containing Compound 1 described herein may be administered to a subject via any route known in the art. These include, but are not limited to, oral, sublingual, nasal, intradermal, subcutaneous, intramuscular, rectal, vaginal, intravenous, intraarterial, intracisternally, intraperitoneal, intravitreal, periocular, topical (as by powders, creams, ointments, or drops), buccal and inhalational administration. Desirably, the articles of the disclosure are administered parenterally as injections (intravenous, intramuscular, or subcutaneous), or locally as injections (intraocularly or into a joint space). The formulations are admixed under sterile conditions with a pharmaceutically acceptable carrier or suspension or resuspension agents (e.g., for micro- and nanoparticles) and any needed preservatives or buffers as may be required.

The articles of the disclosure described herein including a dexamethasone prodrug dimer may be administered to a subject to be delivered in an amount sufficient to deliver to a subject a therapeutically effective amount of an incorporated pharmaceutical agent as part of prophylactic or therapeutic treatment, or as a part of adjunctive therapy to avoid side-effects of another drug or therapy. In general, an effective amount of a pharmaceutical agent or component refers to the amount necessary to elicit the desired biological response. The desired concentration of pharmaceutical agent in the article of the disclosure will depend on numerous factors, including, but not limited to, absorption, inactivation, and excretion rates of the drug as well as the delivery rate of the dexamethasone dimer from the subject compositions, the desired biological endpoint, the agent to be delivered, the target tissue, etc. It is to be noted that dosage values may also vary with the severity of the condition to be alleviated. It is to be further understood that for any particular subject, specific dosage regimens should be adjusted over time according to the individual need and the professional judgment of the person administering or supervising the administration of the compositions. Typically, dosing will be determined using techniques known to one skilled in the art.

The concentration and/or amount of any pharmaceutical agent to be administered to a subject may be readily determined by one of ordinary skill in the art. Known methods are also available to assay local tissue concentrations, diffusion rates from pharmaceutical compositions and local blood flow before and after administration of the therapeutic formulation.

Sterilization of Formulations

Generally, it is desired that a formulation is sterile before or upon administration to a subject. A sterile formulation is essentially free of pathogenic microorganisms, such as bacteria, microbes, fungi, viruses, spores, yeasts, molds, and others generally associated with infections. In some embodiments, articles of the disclosure may be subject to an aseptic process and/or other sterilization process. An aseptic process typically involves sterilizing the components of a formulation, final formulation, and/or container closure of a drug product through a process such as heat, gamma irradiation, ethylene oxide, or filtration and then combining in a sterile environment. In some cases, an aseptic process is preferred. In other embodiments, terminal sterilization is preferred.

Treatment Methods

The formulations of the disclosure may be used in the fields of ophthalmology, oncology, laryngology, endocrinology and metabolic diseases, rheumatology, urology, neurology, cardiology, dental medicine, dermatology, otology, post-surgical medicine, and orthopedics.

Ophthalmic Uses

In certain embodiments, the articles of the disclosure may be used prevent, treat or manage diseases or conditions at the back of the eye, such as at the retina, macula, choroid, sclera and/or uvea.

In some embodiments, the articles of the disclosure are used as injectable drug delivery devices for ophthalmology (e.g., intravitreal injection, coating on a minimally invasive glaucoma surgery (MIGS) devices, or implant in blebs). During an intravitreal injection a medication is placed directly into the space in the back of the eye called the vitreous cavity, which is filled with a jelly-like fluid called the vitreous humor gel. Intravitreal injections may be used to treat retinal diseases such as diabetic retinopathy, macular degeneration, macular edema, uveitis, and retinal vein occlusion.

In certain embodiments, the articles of the disclosure may be used to treat, prevent, or manage an ocular condition, i.e., a disease, ailment, or condition that affects or involves the eye or one or more of the parts or regions of the eye. In some embodiments, the articles of the disclosure may be used to treat, prevent, or manage an ocular condition at the front of the eye of a subject. A front of the eye ocular condition includes a disease, ailment or condition, such as for example, post-surgical inflammation; uveitis; infections; aphakia; pseudophakia; astigmatism; blepharospasm; cataract; conjunctival diseases; conjunctivitis; corneal diseases; corneal ulcer; dry eye syndromes; eyelid diseases; lacrimal apparatus diseases; lacrimal duct obstruction; myopia; presbyopia; pupil disorders; corneal neovascularization; refractive disorders and strabismus. In some embodiments, articles of the disclosure may be used to treat, prevent, or manage an ocular condition at the back of the eye of a subject. A posterior ocular condition can include a disease, ailment, or condition, such as intraocular melanoma; acute macular neuroretinopathy; Behcet's disease; choroidal neovascularization; uveitis; diabetic uveitis; histoplasmosis; infections, such as fungal or viral-caused infections; macular degeneration, such as acute macular degeneration, non-exudative age related macular degeneration and exudative age related macular degeneration; edema, such as macular edema (e.g., cystoid macular edema (CME) and diabetic macular edema (DME)); multifocal choroiditis; ocular trauma which affects a posterior ocular site or location; ocular tumors; retinal disorders, such as central retinal vein occlusion, diabetic retinopathy (including proliferative diabetic retinopathy), proliferative vitreoretinopathy (PVR), retinal arterial occlusive disease, retinal detachment, uveitic retinal disease; sympathetic opthalmia; Vogt Koyanagi-Harada (VKH) syndrome; uveal diffusion; a posterior ocular condition caused by or influenced by an ocular laser treatment; posterior ocular conditions caused by or influenced by a photodynamic therapy, photocoagulation, radiation retinopathy, epiretinal membrane disorders, branch retinal vein occlusion, anterior ischemic optic neuropathy, non-retinopathy diabetic retinal dysfunction, retinitis pigmentosa, retinoblastoma, and glaucoma. In some embodiments, the articles of the disclosure may be used to treat, prevent, or manage dry eye in a subject. In some embodiments, the articles of the disclosure may be used to treat, prevent, or manage inflammation in the eye of a subject. Inflammation is associated with a variety of ocular disorders. Inflammation may also result from a number of ophthalmic surgical procedures, including cataract surgery. In some embodiments, the pharmaceutical agent that is delivered into the eye by the articles of the disclosure and/or methods described herein may be a corticosteroid. In some embodiments, the pharmaceutical compositions of the disclosure are used as adjunctive therapy to reduce inflammation and fibrosis associated with devices (e.g., minimally invasive glaucoma surgery (MIGS) devices). In some embodiments, articles of the disclosure may be used to treat, prevent, or manage age-related macular degeneration (AMD) in a subject.

Osteoarthritis Treatment

In some embodiments, the articles of the disclosure are used for the treatment of osteoarthritis (OA). For OA of the knee, intraarticular (IA) injection (e.g., steroids) is preferred as the last non-operative modality, if other conservative treatment modalities are ineffective. Steroids may be used to reduce inflammation in tendons and ligaments in osteoarthritic joints. IA steroid injections provide short term reduction in OA pain and can be considered as an adjunct to core treatment for the relief of moderate to severe pain in people with OA. Dexamethasone can be used in the treatment of OA. In some embodiments, microspheres of the disclosure composed of Compound 1 are injected into a knee joint for the treatment of OA.

Surgical Procedures

In some embodiments, the articles of the disclosure are used in conjunction with a surgical procedure. For example, an article of the disclosure can be implanted at a surgical site to reduce the risk of inflammation treated by the surgical procedure, or can be used as an adjunctive to reduce the risk of infection.

EXAMPLES

The following examples are put forth to provide those of ordinary skill in the art with a description of how the compositions and methods described herein may be used, made, and evaluated, and are intended to be purely exemplary of the disclosure and are not intended to limit the scope of what the inventors regard as their disclosure.

Example 1: Compound 1
(Dexamethasone-Triethylene
Glycol-Dexamethasone) can be Synthesized,
Processed into Pellets in the Glassy State by Heat
Molding, and Release Drug Through Surface
Erosion from an Intact Pellet Dexamethasone (1 mol equivalent) was suspended in dichloromethane on an ice bath and triethylamine (2 mol equivalent) and triethylene glycol bis(chloroformate) (0.6 mol equivalent) were added to the mixture. The ice bath was allowed to warm to room temperature and the reaction was stirred overnight. The solvent was removed and the solid residue was purified by column chromatography. Product was recrystallized twice from acetonitrile to give Compound 1 (FIG. 1A) as an off-white crystalline solid.

A PXRD diffractogram was recorded using a Bruker D8 Discover with Davinci.Design diffractometer. The X-ray was generated using a cobalt sealed tube source ($\lambda$=1.79026 Å) with a voltage of 35 kV and a current of 45 mA. A Vantec 500 (MiKroGap Technology) area detector was used with 6 frames at 600 s per frame at a distance of 20.0 cm from the sample. Raw data was integrated using Diffrac.Eva (version 4.2.1) and displayed in Topas software (Version 4.2; Bruker-AXS). The PXRD diffractogram of solid crystalline Form III of Compound 1 is shown FIG. 1C, with peaks expressed in degrees 2θ (±0.200°) of 9.316°, 11.501°, 14.019°, 15.982°, 17.268°, 17.685°, 18.658°, 20.440°, 21.782°, 23.472°, 29.816°, and/or 33.150°.

Compound 1: HPLC (mobile phase: $H_2O$/TFA and MeCN/TFA) 31.7 min; Elemental analysis: Anal. Calcd for $C_{62}H_{68}F_2O_{16}$: C, 63.27; H, 6.94; N, 0.00; CI, 0.00 Found: C, 62.62; H, 6.84; N, <0.50; CI<100 ppm. $^1$H NMR (400 MHz, DMSO-d6) δ (ppm) 0.80 (d, J=7 Hz, 6H, 2×C16 α-$CH_3$); 0.90 (s, 6H, 2×C18-$CH_3$); 1.08 (m, 2H, 2×C16-H); 1.35 (m, 2H, 2×C14-H); 1.49 (s, 6H, 2×C19-$CH_2$); 1.54 (q, J=13 Hz, 2H, 2×C13-H); 1.64 (q, J=11 Hz, 2H, 2×C15-$CH_2$); 1.77 (m, 2H, 2×C15-$CH_2$); 2.15 (m, 4H, 2×C6-$CH_2$); 2.32 (m, 4H, 2×C7-$CH_2$); 2.62 (m, 2H, 2×C12-$CH_2$); 2.89 (m, 2H, 2×C12-$CH_2$); 3.57 (s, 4H, 2×TEG O$CH_2$); 3.65 (m, 4H, 2×TEG O$CH_2$); 4.15 (m, 2H, 2×OCH); 4.22 (m, 4H, 2×TEG O$CH_2$); 4.79 (d, 2H, AB, J=18.5 Hz, 2H, C21-$CH_2$O—); 5.09 (d, 2H, AB, J=18.5 Hz, 2H, C21-$CH_2$O—); 5.18 (s, 2H, C17-OH); 5.40 (d, 2H, J=4.5 Hz, C11-0H); 6.01 (d, 2H, J=1.9 Hz, 2×alkene C4-CH); 6.23 (dd, 2H, J=10.1 and 1.9 Hz, CH, 2×alkene C2-CH); 7.29 (d, 2H, C1-CH 2×alkene CH, 10.1 Hz, 2H). MS (ESI+) m/z: [M+H]+ Calcd for $C_{52}H_{69}F_2O_{16}$ 987.46; Found 987.46.

Figure 1C:
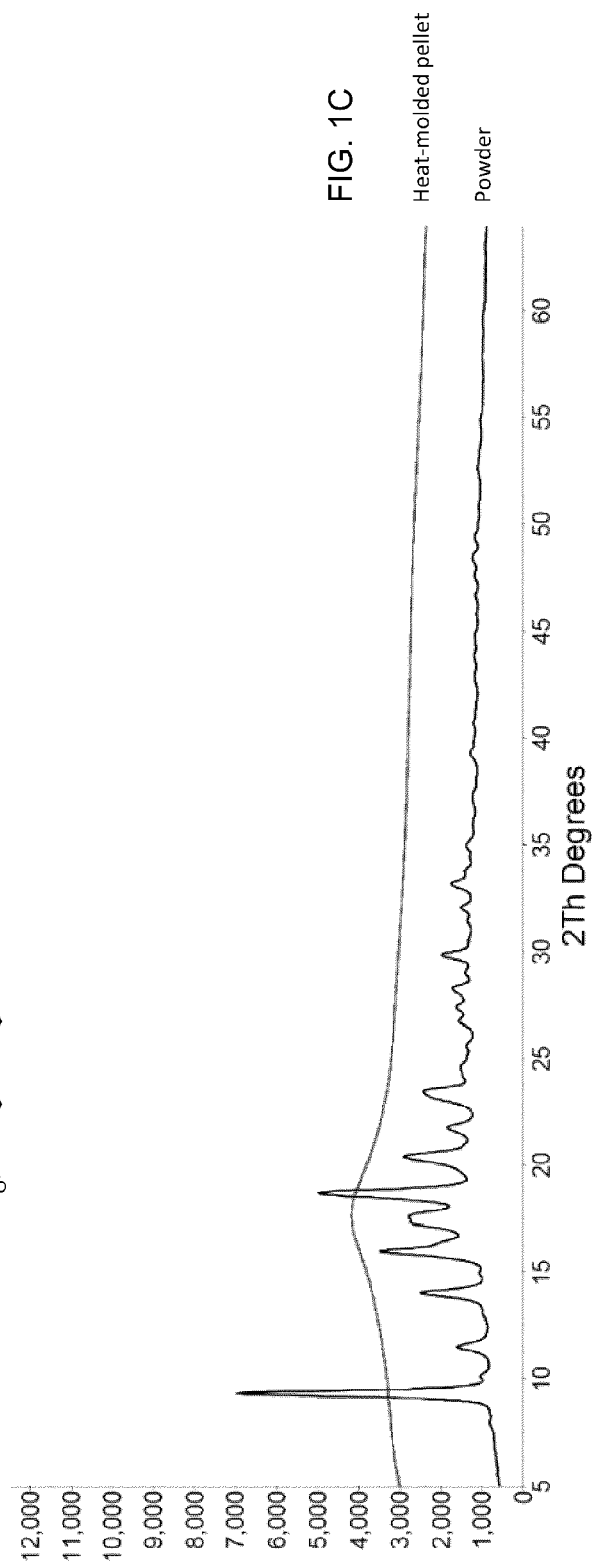

Compound 1 was formed into pellets in the glassy state by heat molding (FIG. 1B). Crystalline powder was melted at 185° C. and pellets were formed from 1 mm×1 mm cylindrical molds. The starting powder and heat-processed pellets were tested by powder X-ray diffraction (PXRD; FIG. 1C), using the equipment described above, to confirm heat-processing converted Compound 1 from the crystalline state to the glassy state.

Heat-molded pellets from Compound 1 (~1 mm×1 mm) were then placed in 20 mL glass vials and 2 mL of release buffer (either 100% phosphate buffered saline (PBS), 1% fetal bovine serum (FBS) in PBS, or 100% FBS) was added. Samples were incubated at 37° C. on a shaker rotating at 115 rpm. After 1 day, 3 days, 7 days, and subsequently in alternating 3 and 4 day intervals (i.e., 1, 3, 7, 10, 14 days etc.), release buffer was sampled directly (PBS) or syringe filtered, proteins were precipitated with acetonitrile, and drug release products were extracted. The samples were analyzed by high performance liquid chromatography (HPLC) to quantify drug products. Cumulative drug release was calculated and plotted as a percentage of the total drug in each pellet released over time (FIG. 2).

Example 2: Form I—a Solid Crystal of Compound 1

PXRD diffractograms generated for Examples 2 through 9 used a Copper X-ray source, different from the Cobolt X-ray source used in Example 1. There were two machines used to collect the PXRD diffractograms:
1. Some PXRD diffractograms were recorded on a Bruker D8 Discover powder X-ray diffractometer (Bruker-AXS, Karlsruhe, Germany). The sample holder was oscillated along X and Y axes during the measurement. The generator was an Incoatec IµS Copper X-ray source (IMSTube: Cu tube with $\lambda$=1.54184 Å) with a voltage of 50 kV and current of 1.00 mA. For each sample, one frame was collected using a still scan with an Eiger2R_500 K detector at the distance of 134.2 mm from the sample. Raw data were evaluated using the program EVA (Bruker-AXS, Karlsruhe, Germany). 2. Other PXRD diffractograms were recorded on a Bruker D2 Phaser powder X-ray diffractometer (Bruker-AXS, Karlsruhe, Germany). The sample holder was rotated during the measurement. The generator was a SIEMENS KFL Cu 2K X-ray source (IMSTube: Cu tube with $\lambda$=1.54060 Å) with a voltage of 30 kV and current of 10.0 mA. A source slit of 0.2 mm, an air-scatter screen at 1 mm and a detector slit of 3 mm were used. For each sample, one scan was performed using a coupled theta-twotheta scan with a LynxEye detector at the distance of 141 mm from the sample. Raw data were evaluated using the program EVA (Bruker-AXS, Karlsruhe, Germany).

Figure 3:
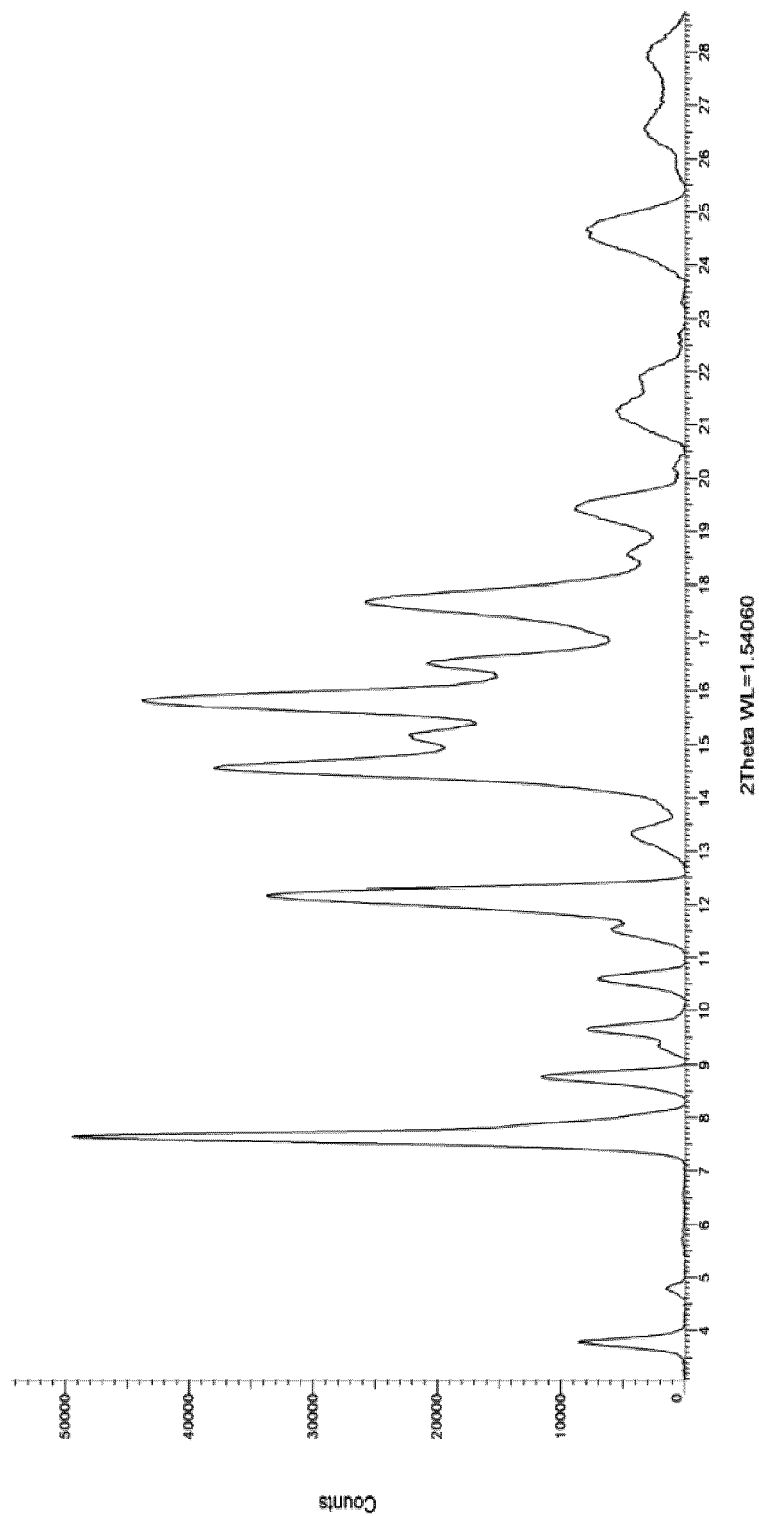
FIG. 3 is a powder X-ray diffraction (PXRD) diffractogram of solid crystalline Form I of Compound 1 described in Example 2.
Figure 4:
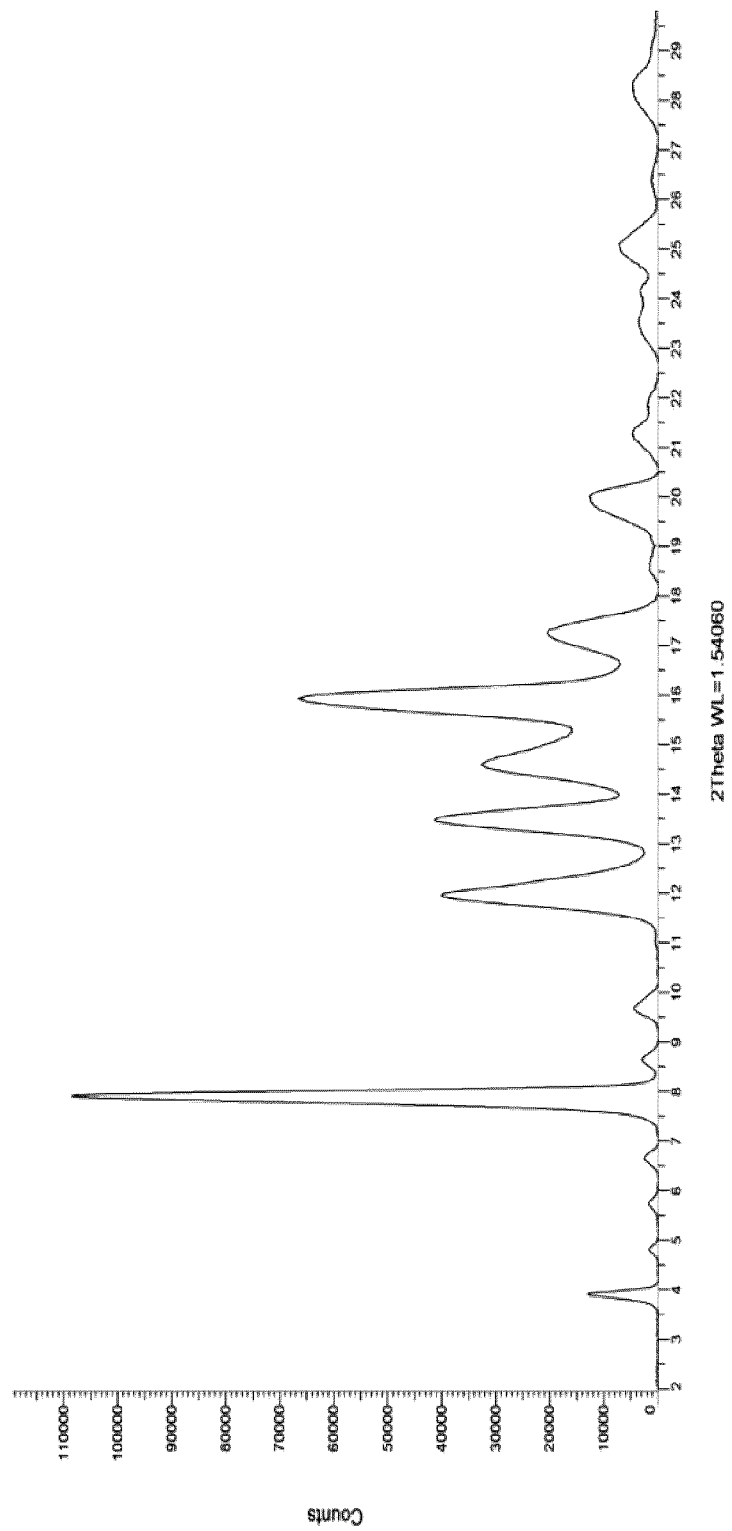
FIG. 4 is a powder X-ray diffraction (PXRD) diffractogram of solid crystalline Form H of Compound 1 described in Example 3.
Figure 5:
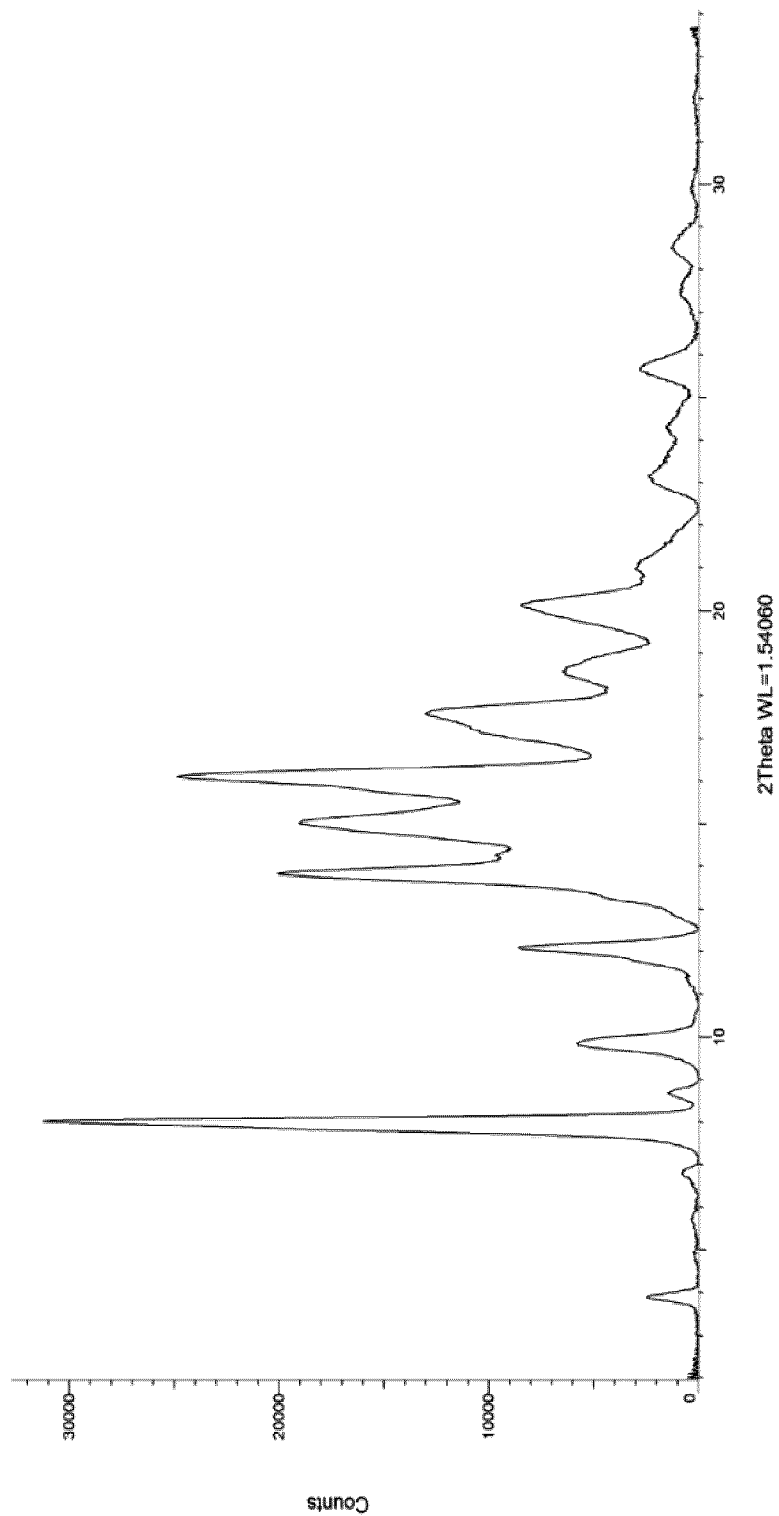
FIG. 5 is a powder X-ray diffraction (PXRD) diffractogram of solid crystalline Form III of Compound 1 described in Example 4.

A PXRD diffractogram of solid crystalline Form I of Compound 1 is shown FIG. 3. The PXRD diffractogram peaks for Form I expressed in degrees 2θ (±0.20°) are tabulated below.

| Form I | |
| --- | --- |
| Angle 2θ (±0.20°) | Rel. Intensity |
| 3.79 | 17.00% |
| 7.59 | 87.40% |
| 8.78 | 23.40% |
| 9.66 | 15.80% |
| 10.60 | 14.30% |
| 12.18 | 68.10% |
| 13.36 | 8.60% |
| 14.57 | 77.00% |

Crystals of Form I were prepared by magnetically stirring a suspension of Compound 1 (11 g) in Acetonitrile (110 ml) and heating to afford a solution. The solution was cooled to room temperature and stirred for 16 hours. A white solid was filtered and dried (~54% yield, m.p. 157.1-161.3° C.).

Example 3: Form II—a Solid Crystal of Compound 1

PXRD diffractograms were recorded as described in Example 2. A PXRD diffractogram of solid crystalline Form II of Compound 1 is shown FIG. 4. The PXRD diffractogram peaks for Form II expressed in degrees 2θ (±0.20°) are tabulated below.

| Form II | |
| --- | --- |
| Angle 2θ (±0.20°) | Rel. Intensity |
| 3.91 | 11.80% |
| 4.81 | 1.50% |
| 5.74 | 1.50% |
| 6.65 | 2.30% |
| 7.91 | 100.00% |
| 8.66 | 2.70% |
| 9.68 | 4.10% |
| 11.96 | 37.00% |
| 13.48 | 38.20% |
| 14.59 | 30.20% |
| 15.93 | 61.40% |
| 17.25 | 18.90% |

Crystals of Form II were prepared by magnetically stirring suspension of Compound 1 (30.4 g) in Acetonitrile (455 ml) and heating to 70° C. to afford a solution. The solution was cooled to room temperature and left for couple of days. A white solid was filtered and dried. Recrystallization was repeated at the same conditions (~77% yield, m.p. 164.2-167.7° C.).

Example 4: Form III—a Solid Crystal of Compound 1

PXRD diffractograms were recorded as described in Example 2. A PXRD diffractogram of solid crystalline Form III of Compound 1 is shown FIG. 5. The PXRD diffractogram peaks for Form III expressed in degrees 2θ (±0.20°) are tabulated below.

| Form III | |
| --- | --- |
| Angle 2θ (±0.20°) | Rel. Intensity |
| 3.90 | 7.70% |
| 8.02 | 100.00% |
| 9.84 | 18.50% |
| 12.10 | 27.30% |
| 13.83 | 64.40% |
| 15.02 | 61.20% |
| 16.12 | 79.60% |
| 17.58 | 41.60% |

Figure 6:
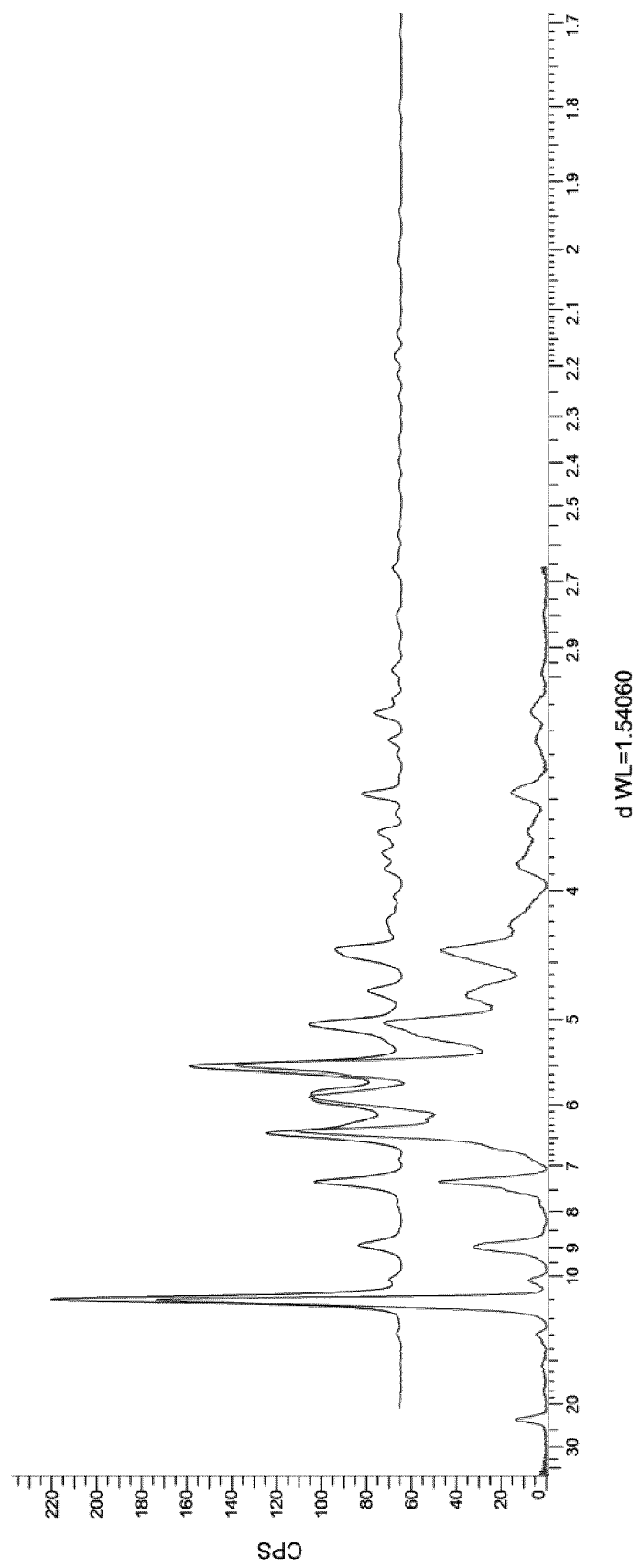
FIG. 6 is an overlay of the solid crystal Form III of Example 4 and the crystals of Example 1, correcting for the X-ray sources. The overlay shows that the crystals of Example 1 and Example 4 are both Form III.
Figure 7:
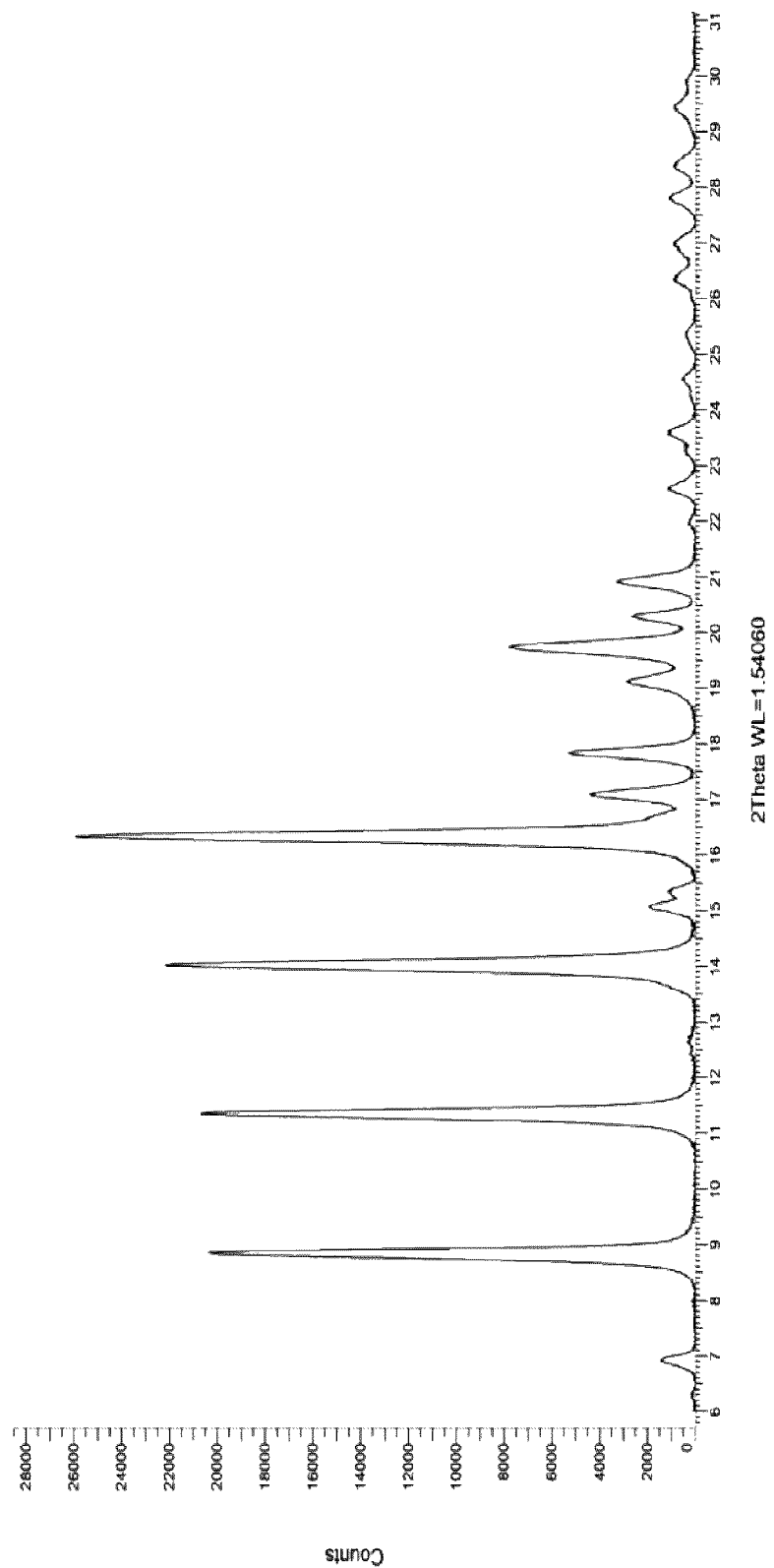
FIG. 7 is a powder X-ray diffraction (PXRD) diffractogram of solid crystalline Form IV of Compound 1 described in Example 5.
Figure 8:
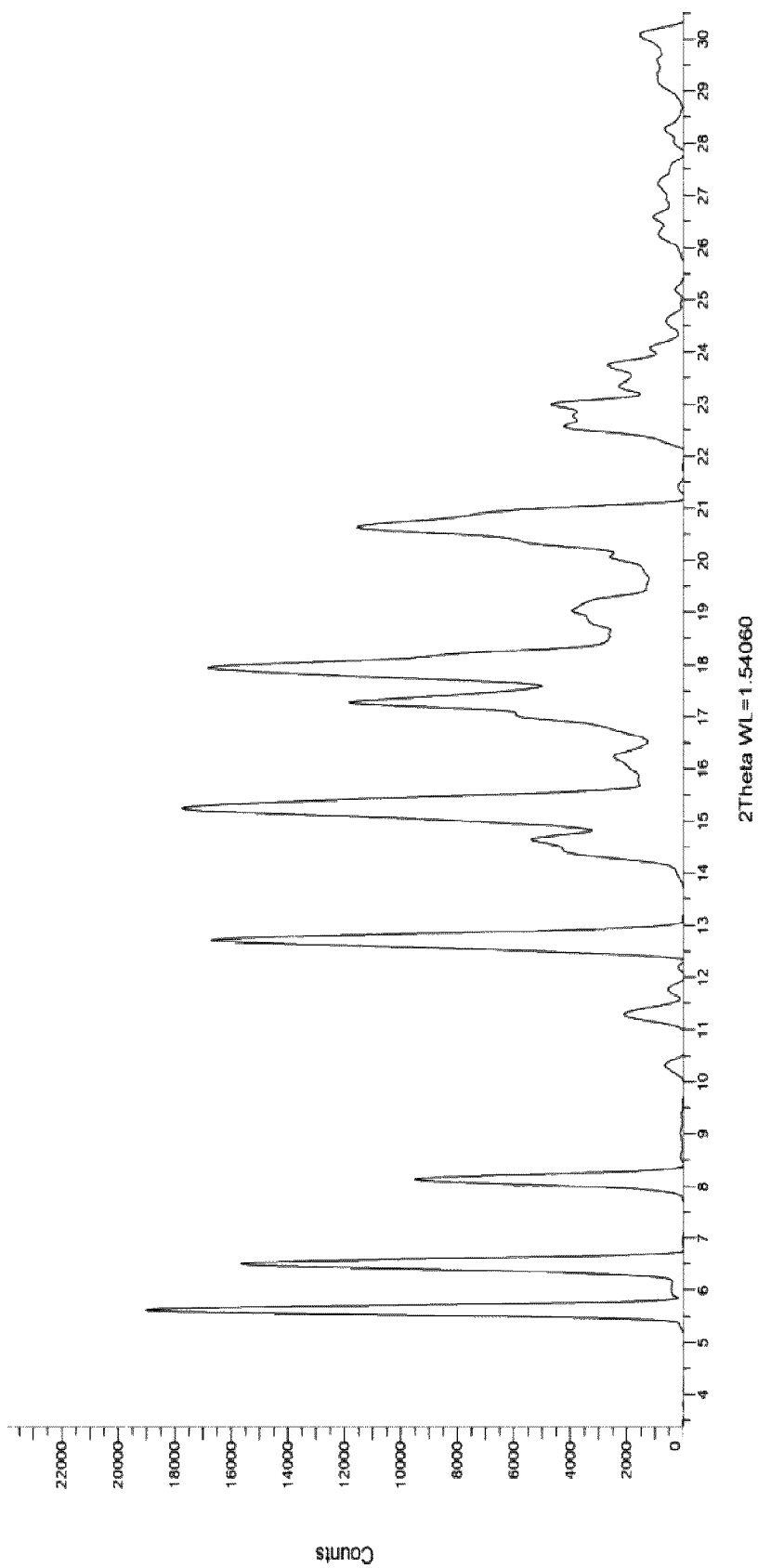
FIG. 8 is a powder X-ray diffraction (PXRD) diffractogram of solid crystalline Form V of Compound 1 described in Example 6.
Figure 9:
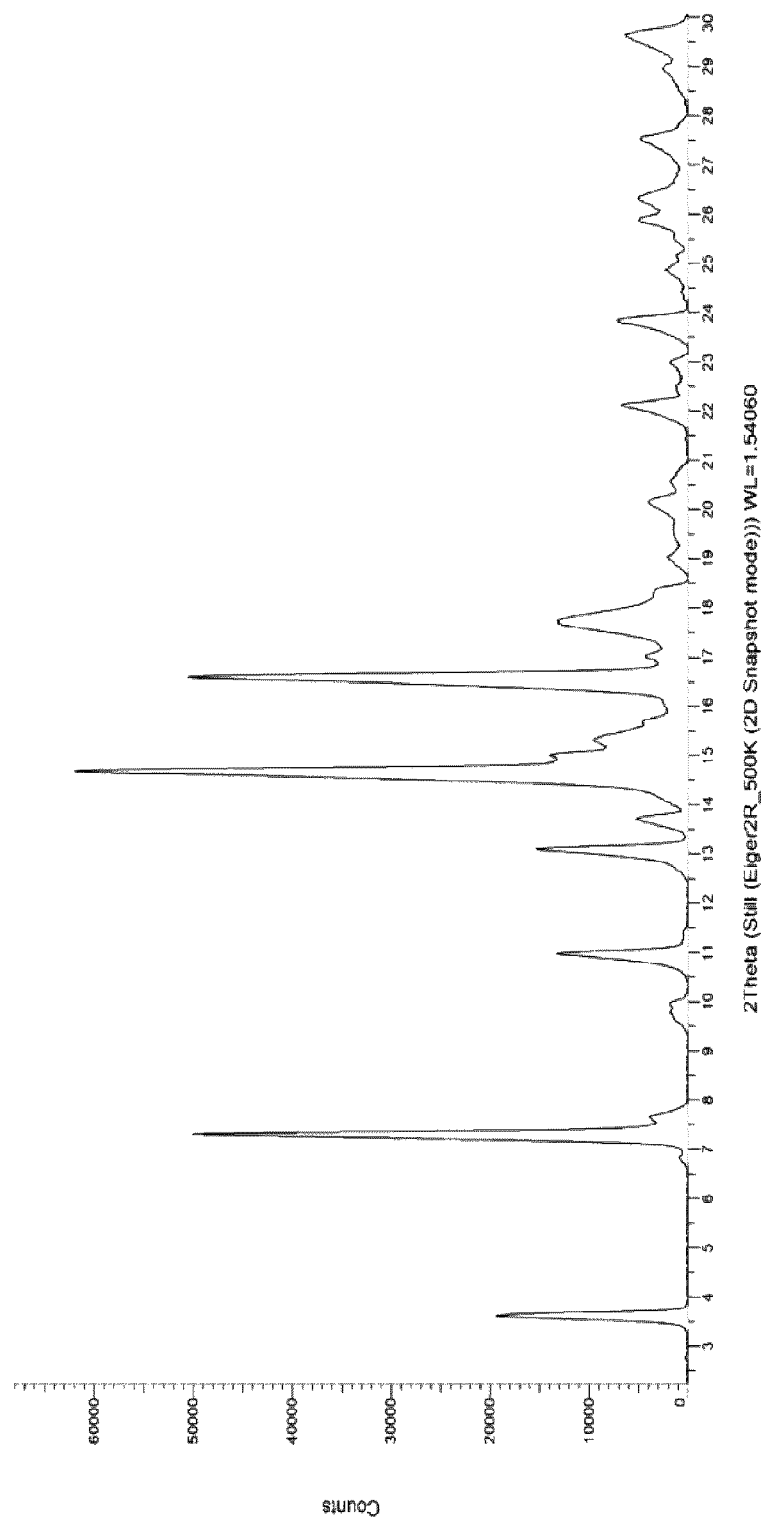
FIG. 9 is a powder X-ray diffraction (PXRD) diffractogram of solid crystalline Form VI of Compound 1 described in Example 7
Figure 10:
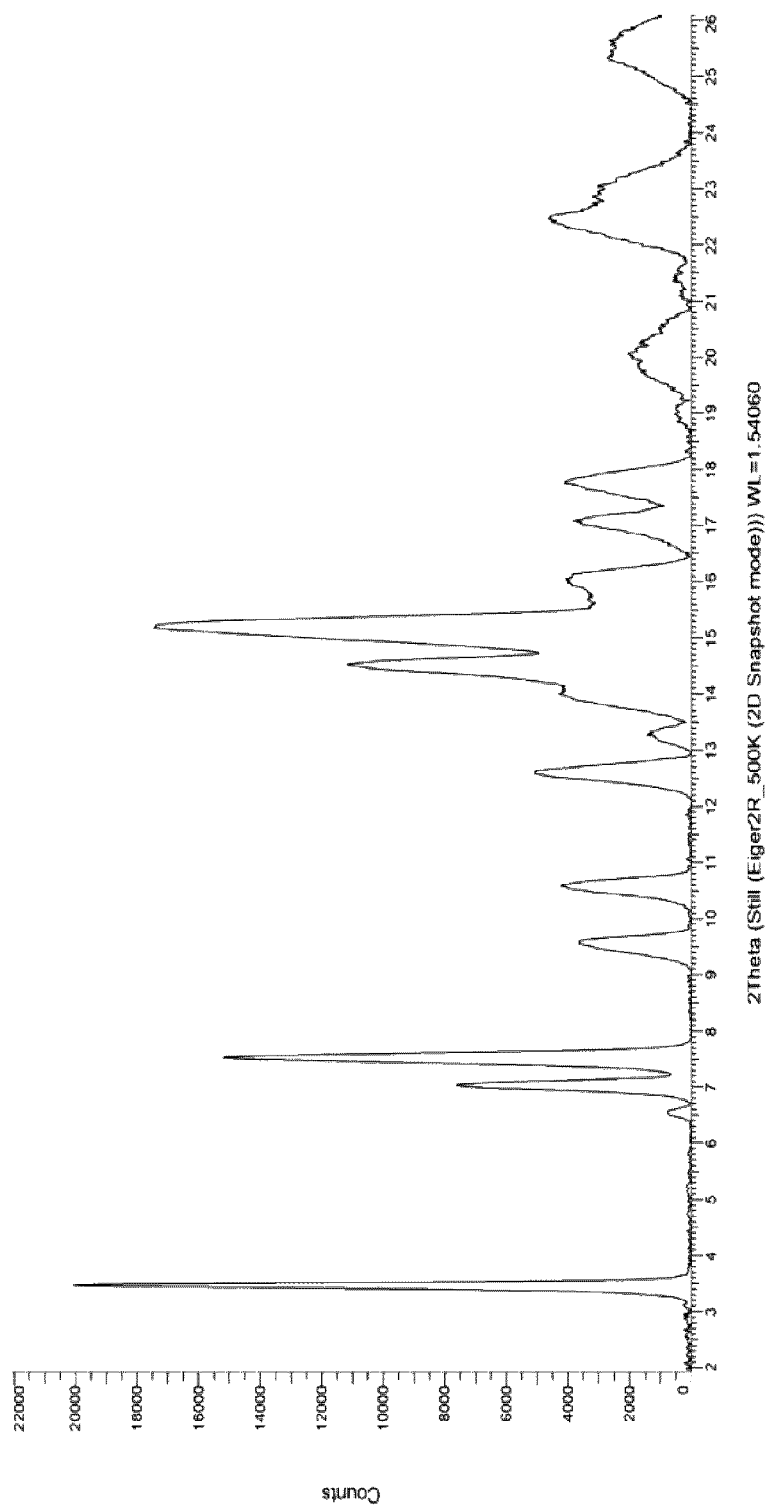
FIG. 10 is a powder X-ray diffraction (PXRD) diffractogram of solid crystalline Form VII of Compound 1 described in Example 8.
Figure 11:
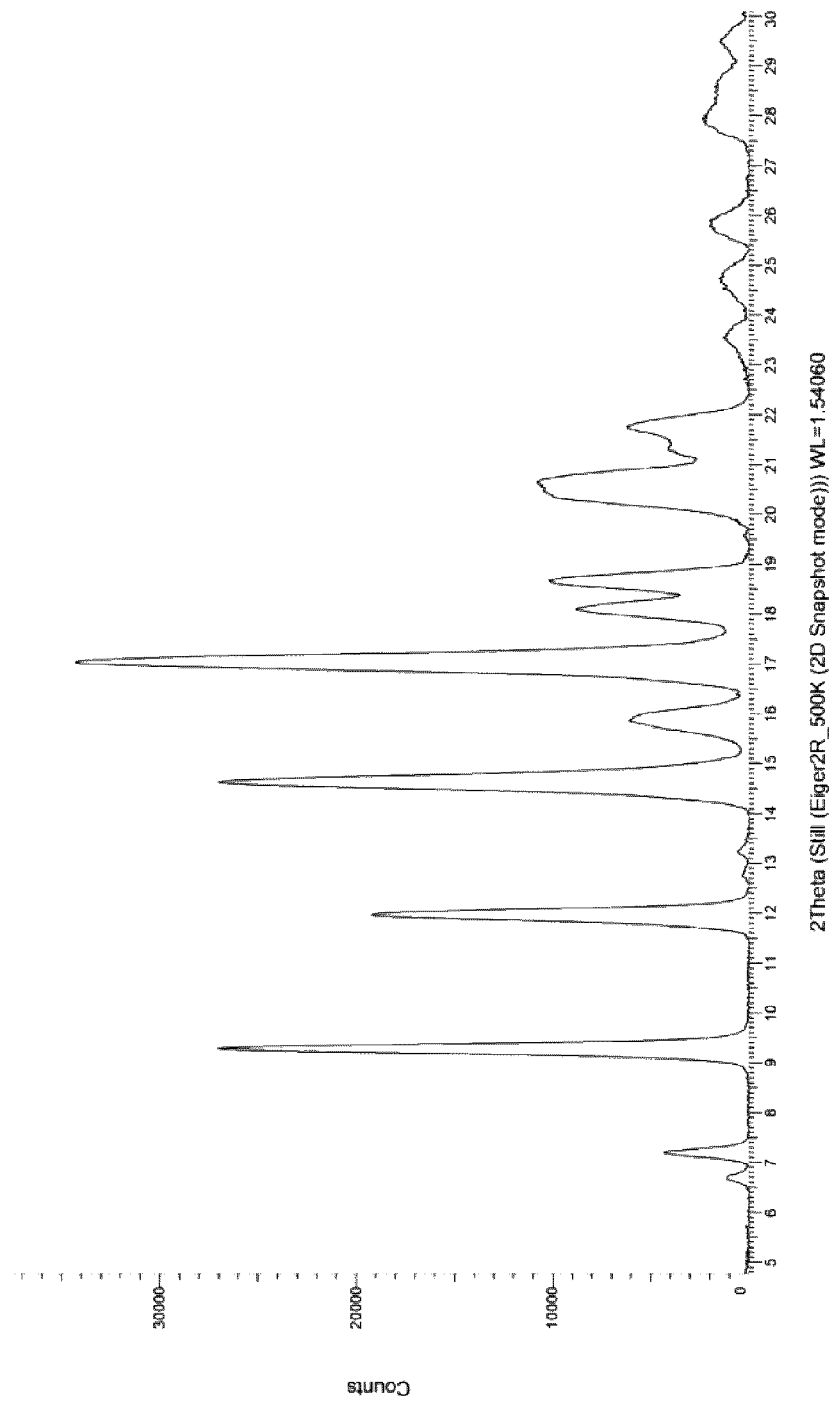
FIG. 11 is a powder X-ray diffraction (PXRD) diffractogram of solid crystalline Form VIII of Compound 1 described in Example 9.

The PXRD diffractogram in Example 1 was also Form III but was captured using the cobalt X-ray source instead of the copper X-ray source as used in this example. As a result of the different X-ray sources, the 2θ values differ despite being the same form (Form III). FIG. 6 shows an overlay of the PXRD diffractograms from the two different X-ray sources from Example 1 and this example where the 2θ values were converted to d values to demonstrate both are Form III.

Crystals of Form III were prepared by forming a suspension of Compound 1 (6.83 g) in Acetonitrile (683 ml). The solution was heated to 40° C. with sonication for 30 min to afford a fine suspension which was filtered through a Whatman 40 filter paper to afford a clear yellow solution. This solution was placed in the freezer (−20° C.) and left for 4 h. A white solid (4.66 g) was collected by filtration and suspended in Acetonitrile (466 ml), heated to 40° C. with sonication for 30 min to afford a fine suspension, and filtered through a Whatman 40 filter paper to afford a clear light yellow solution. This solution was placed in the freezer (−20° C.) and left for 4 h. A white solid (4.16 g) was filtered and dried. (~61% yield, m.p. 172° C.).

Example 5: Form IV—a Solid Crystal of Compound 1

PXRD diffractograms were recorded as described in Example 2. A PXRD diffractogram of solid crystalline Form IV of Compound 1 is shown FIG. 7. The PXRD diffractogram peaks for Form IV expressed in degrees 2θ (±0.20°) are tabulated below.

| Form IV | |
|---|---|
| Angle 2θ (±0.20°) | Rel. Intensity |
| 7.00 | 4.70% |
| 8.90 | 68.90% |
| 11.39 | 100.00% |
| 14.11 | 32.40% |
| 16.39 | 35.70% |
| 17.09 | 36.20% |
| 17.90 | 10.50% |
| 19.12 | 27.70% |
| 19.79 | 13.50% |
| 20.29 | 12.70% |

Crystals of Form IV were prepared by magnetically stirring a suspension of compound 1 (4 g) in 1,4-Dioxane (30 ml) and heating to 40° C. to afford a solution. The solution was cooled to room temperature. A white solid was filtered and vacuum dried at 50° C. (~90% yield, m.p. 223.2-226.4° C. (decomp.)).

Example 6: Form V—a Solid Crystal of Compound 1

PXRD diffractograms were recorded as described in Example 2. A PXRD diffractogram of solid crystalline Form V of Compound 1 is shown FIG. 8. The PXRD diffractogram peaks for Form V expressed in degrees 2θ (±0.20°) are tabulated below.

| Form V | |
|---|---|
| Angle 2θ (±0.20°) | Rel. Intensity |
| 5.63 | 100.00% |
| 6.53 | 81.10% |
| 8.14 | 48.90% |
| 10.34 | 3.50% |
| 11.28 | 10.40% |
| 11.77 | 3.60% |
| 12.73 | 79.40% |
| 14.50 | 20.40% |
| 15.23 | 83.30% |
| 17.29 | 58.20% |

Crystals of Form V were prepared by magnetically stirring a suspension of Compound 1 (19.6 mg) in 1,4-Dioxane (1.6 ml), heating to 60° C. for approximately 4 hours, cooling to 20° C. at 0.02° C./min rate, and storing at 5° C. for a few days. A white solid was isolated (m.p. 203.4-210.1° C.).

Example 7: Form VI—a Solid Crystal of Compound 1

PXRD diffractograms were recorded as described in Example 2. A PXRD diffractogram of solid crystalline Form VI of Compound 1 is shown FIG. 9. The PXRD diffractogram peaks for Form VI expressed in degrees 2θ (±0.20°) are tabulated below.

| Form VI | |
|---|---|
| Angle 2θ (±0.20°) | Rel. Intensity |
| 3.62 | 30.30% |
| 7.31 | 80.50% |
| 9.81 | 2.90% |
| 10.98 | 21.40% |
| 13.11 | 24.80% |
| 14.69 | 100.00% |
| 16.60 | 82.30% |

Crystals of Form VI were prepared by magnetically stirring a suspension of Compound 1 (1.12 g) in Acetonitrile-Water 10% v/v (18 ml) and heating to 60° C. for approximately 1 hour. An additional portion of Acetonitrile-Water 10% v/v (6 ml) was added to afford a clear solution. The solution was filtered while hot to remove particles not dissolved. Water (16.5 ml) was added to the solution dropwise. Solution was removed from the heating and was magnetically stirred for 3 hours at room temperature. A white solid was filtered (~80% yield, m.p. 148.7-155.3° C.).

Example 8: Form VII—a Solid Crystal of Compound 1

PXRD diffractograms were recorded as described in Example 2. A PXRD diffractogram of solid crystalline Form VII of Compound 1 is shown FIG. 10. The PXRD diffractogram peaks for Form VII expressed in degrees 2θ (±0.20°) are tabulated below.

| Form VII | |
|---|---|
| Angle 2θ (±0.20°) | Rel. Intensity |
| 3.47 | 100.00% |
| 7.04 | 39.30% |
| 7.53 | 78.40% |
| 9.60 | 18.70% |
| 10.59 | 22.10% |
| 12.62 | 25.90% |
| 14.53 | 57.90% |
| 15.19 | 90.00% |

Crystals of Form VII were prepared by magnetically stirring a suspension of Compound 1 (160 mg) in Acetonitrile (2.3 ml) and heating to 60° C. for approximately 1.5 hours. An additional portion of Acetonitrile (0.75 ml) was added to afford a clear solution. Water (5.25 ml) was added to the solution dropwise. Solution was removed from the heating and was magnetically stirred for 3 hours at room temperature. A white solid was filtered (~80% yield, m.p. 150.5-154.7° C.).

Example 9: Form VIII—a Solid Crystal of Compound 1

PXRD diffractograms were recorded as described in Example 2. A PXRD diffractogram of solid crystalline Form VIII of Compound 1 is shown FIG. 11. The PXRD diffractogram peaks for Form VIII expressed in degrees 2θ (±0.20°) are tabulated below.

| Form VIII | |
|---|---|
| Angle 2θ (±0.20°) | Rel. Intensity |
| 4.75 | 3.40% |
| 6.62 | 2.00% |
| 7.16 | 12.70% |
| 9.20 | 80.40% |
| 11.86 | 53.50% |
| 14.52 | 77.60% |
| 15.82 | 20.60% |
| 16.92 | 100.00% |
| 17.88 | 21.60% |
| 18.51 | 24.70% |

Crystals of Form VIII were prepared by magnetically stirring a suspension of Compound 1 (9 mg) in tetralin (800 µL) and heating at 50° C. for 1 hour. A portion of suspension (250 µL) was filtered and 400 µL heptane was added to the filtrate. A white solid was obtained after removal of the solvent.

Alternatively crystals of Form VIII were prepared by magnetically stirring a suspension of Compound 1 (9 mg) in 2-Methyl-2-Propanol (800 µL) and heating at 50° C. for 1 hour. A portion of suspension (250 µL) was filtered and 400 µL heptane was added to the filtrate. A white solid was obtained after removal of the solvent.

Example 10: Drug Release from Form I/II and Form IV of Compound 1

Figure 12:
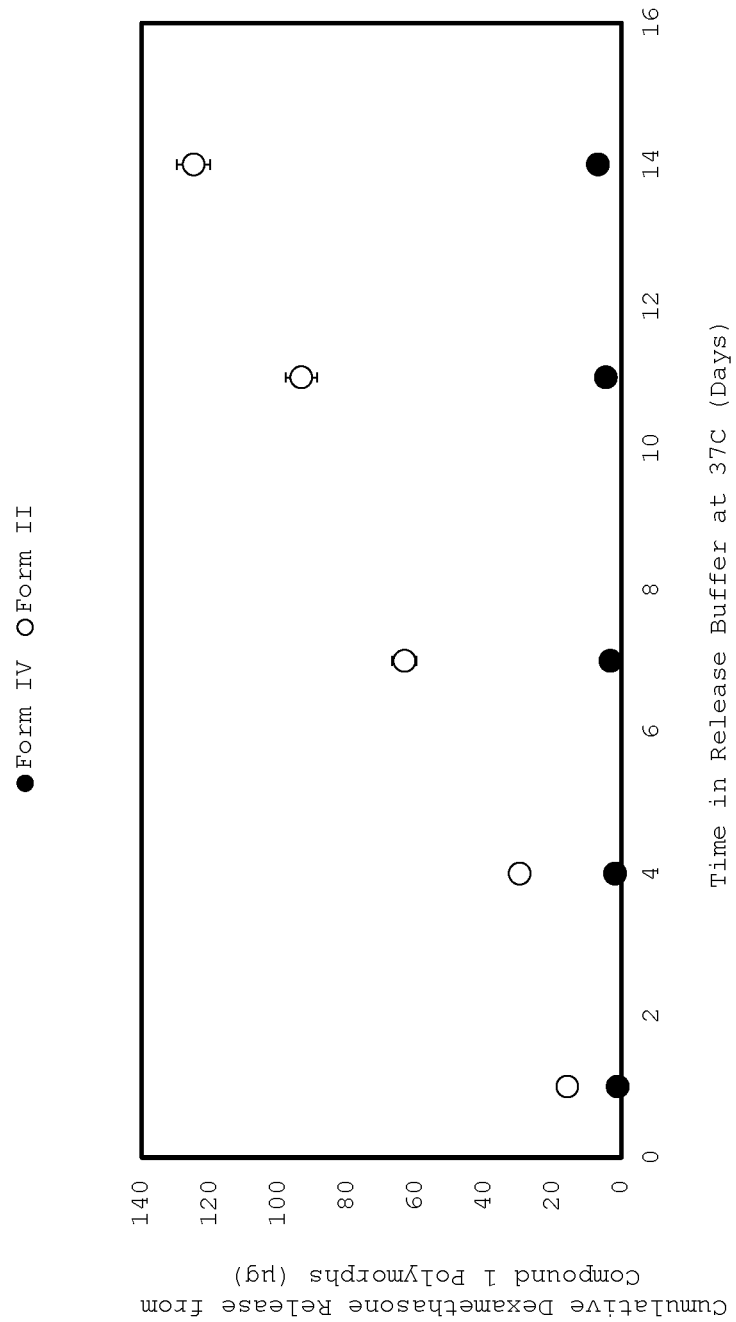
FIG. 12 is a graph depicting the release of Compound 1 from crystalline powders suspended in phosphate buffered saline (PBS) with 50% fetal bovine serum (FBS). The release of Compound 1 from the different crystalline forms was quantified by HPLC over time as described in Example 10. Form I/II provided faster release compared to Form IV. Form I, II, or the mixture of Form I/II would be preferred in situations where faster dissolution is required, and Form IV would be preferred in situations where slower dissolution is required.

Form I/II (mixture) and Form IV of Compound 1 were formed from acetonitrile and ethanol respectively. The crystalline powders were suspended in phosphate buffered saline (PBS) with 50% fetal bovine serum (FBS) and drug release from the different forms was quantified by HPLC over time (see FIG. 12). Form I/II provided faster release compared to Form IV. Form I, II, or the mixture of Form I/II would be preferred in situations where faster dissolution is required, and Form IV would be preferred in situations where slower dissolution is required.

Example 11: Melting Points of Form I/II and Form IV

Figure 13:
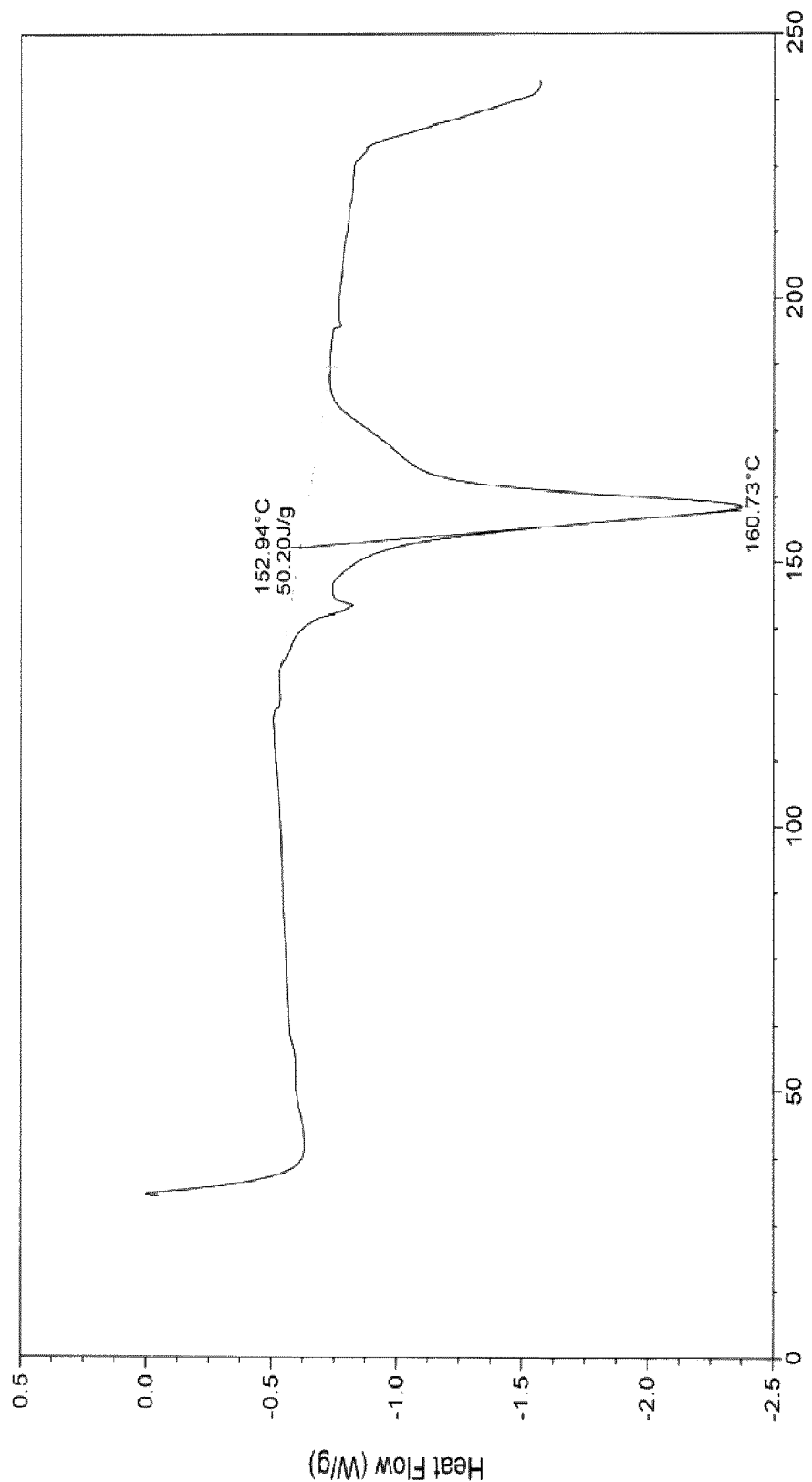
FIG. 13 is a graph depicting the differential scanning calorimetry (DSC) curve for a mixture of Forms I and II. Form I/II (mixture) has a melting point of −160-165° C.
Figure 14:
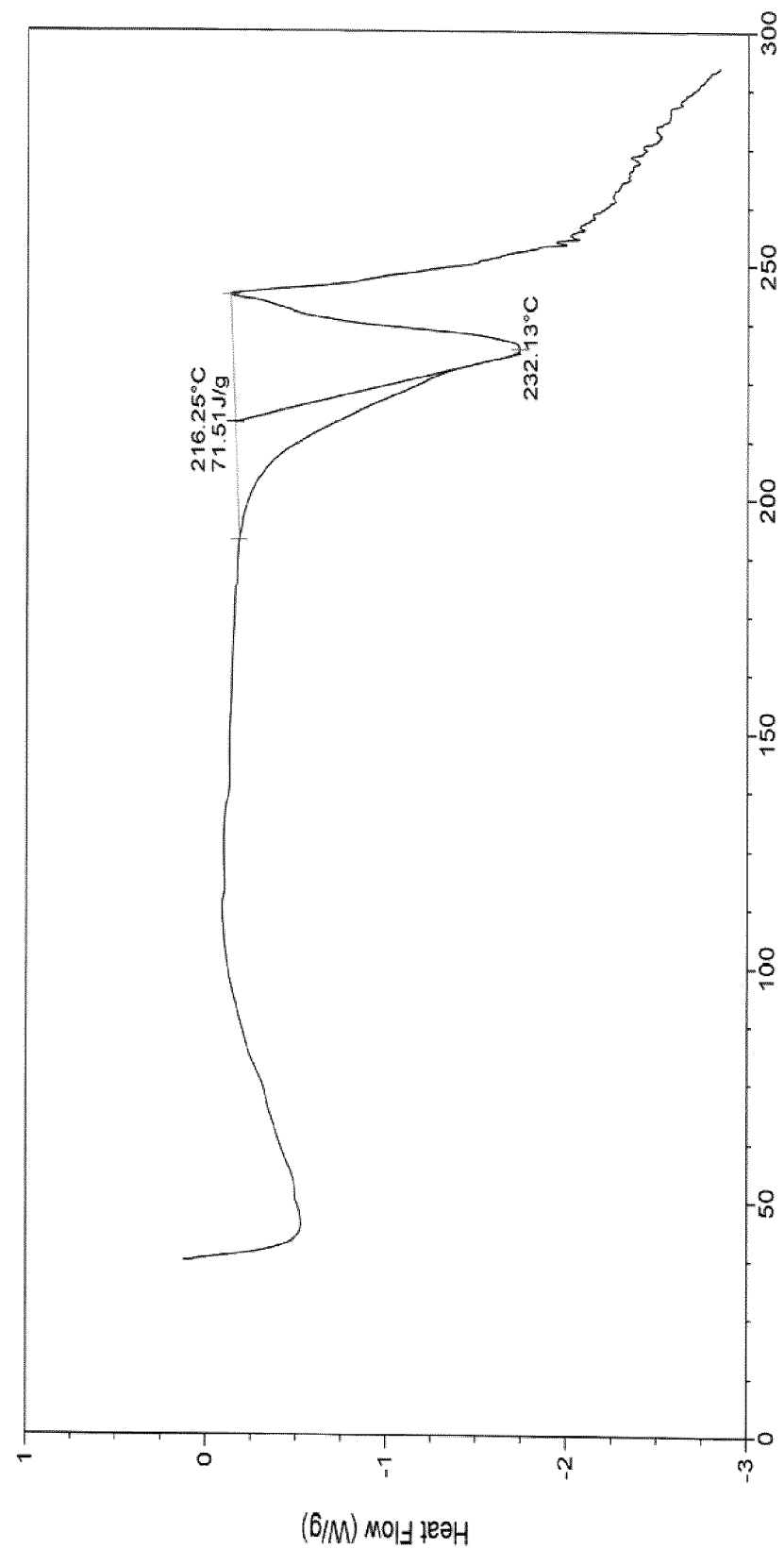
FIG. 14 is a graph depicting the differential scanning calorimetry (DSC) curve for Form IV. Form IV has a melting point 216-232° C.

Form I/II (mixture) has a melting point of −160-165° C. as observed by the differential scanning calorimetry (DSC) curve shown in FIG. 13 and therefore has the benefit of being able to be heat processed. Form IV has a significantly higher melting point 216-232° C. shown in FIG. 14 and decomposes on heating.

Example 12: Stability of Forms II and IV

Form IV was the most thermodynamically stable polymorph observed, and most other polymorphs were observed to change into Form IV over time, or upon heating slowly. For example, stability testing of Forms VIII and amorphous forms showed conversion to Form IV by PXRD after 14 days at room temperature and/or cooling at 0° C. for 14 days. Finally, Form IV was not seen to convert into any other polymorphs under the conditions tested. Thus, Form IV in solid form has the advantage of longer-term shelf life without interconversion into another crystalline form.

Form II was also observed to possess high thermodynamic stability and was not observed to convert to Form IV under the conditions tested. Because Form II possesses a low melting point, it is a crystal form with high stability that can also be used for high temperature processing into articles of the invention.

Example 13: Solubility of Forms II and IV

Figure 15:
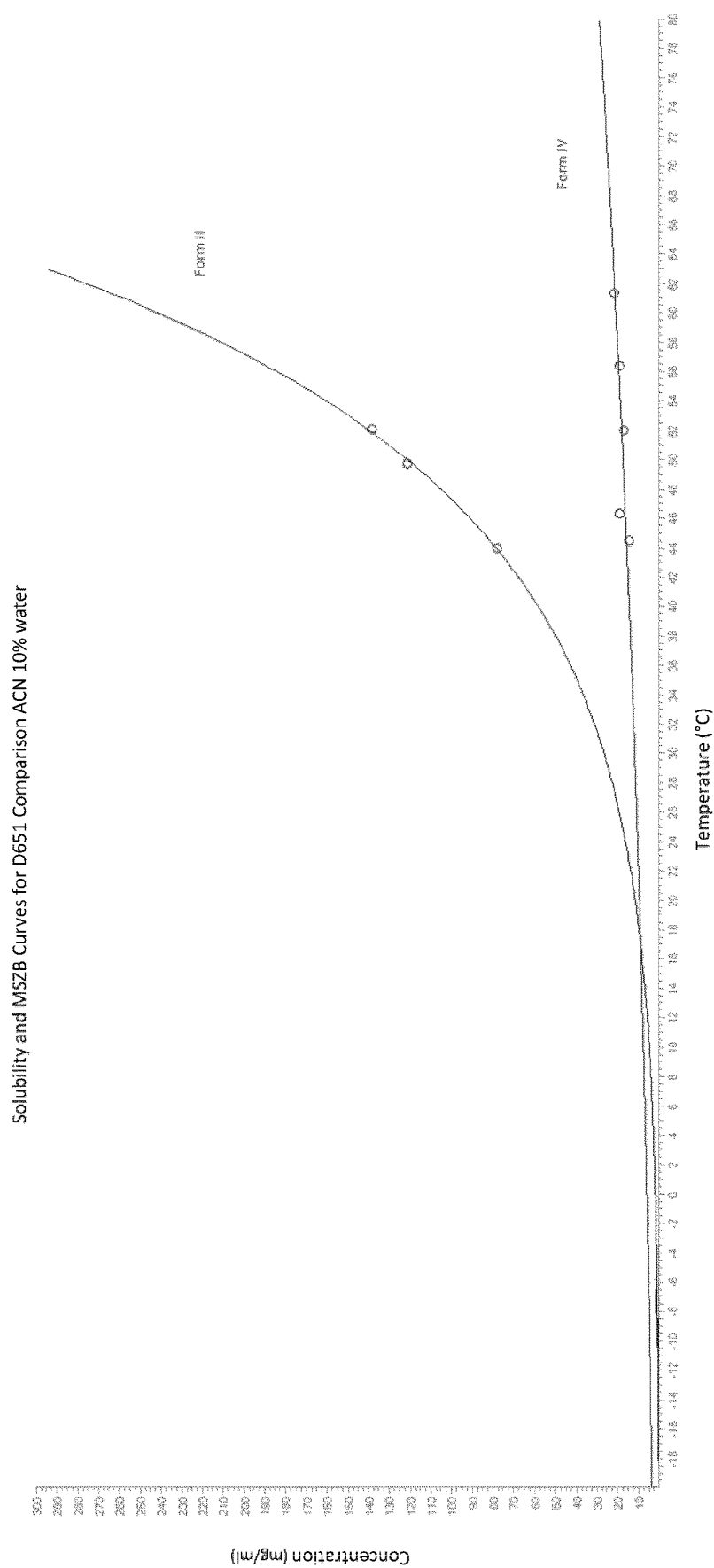
FIG. 15 is a graph depicting the difference in the solubilities (mg/mi) of Form II and Form IV in 10% acetonitrile/water as a function of temperature. Form II is much more soluble in organic solvents than Form IV (see Example 13).

The solubility of Form II and Form IV were measured in in 90% acetonitrile-10% water as a function of temperature (see FIG. 15). Form II was observed to exhibit higher solubility, especially at higher temperatures.

Form IV was also observed to exhibit significantly lower solubility (ca. 10-fold lower) in organic solvents (e.g., acetonitrile, ethanol, tetrahydrofuran, 2-methyl tetrahydrofuran, isobutyl acetate, acetone, butyl acetate, ethyl acetate, isopropyl acetate and methanol) than Form II. This observation has implications for coating applications as making high concentration coating solutions (e.g., for coating a surface by dip coating or spray coating a solution of Compound 1 onto the surface) will be much more practical from Form II than from Form IV.

Other Embodiments

This application claims the benefit of U.S. Provisional Ser. No. 62/883,170, filed Aug. 6, 2019, and PCT application No. PCT/CA2019/050136, filed Feb. 1, 2019, each of which is incorporated herein in its entirety.

Although the foregoing disclosure has been described in some detail by way of illustration and example for purposes of clarity of understanding, the descriptions and examples should not be construed as limiting the scope of the disclosure. The disclosures of all patent and scientific literature cited herein are expressly incorporated in their entirety by reference.

The invention claimed is:

1. A solid crystalline form of a compound represented by the following formula:

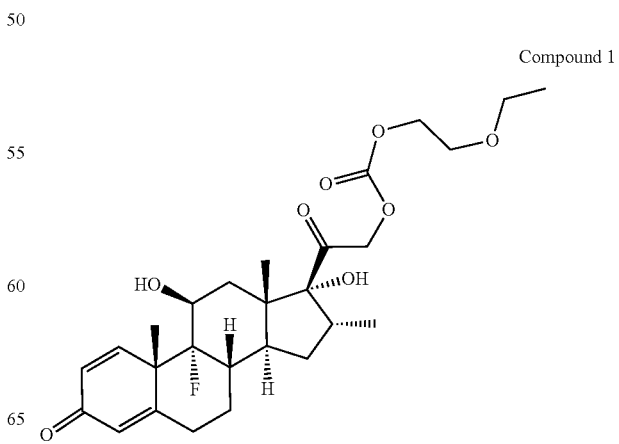

Compound 1

-continued

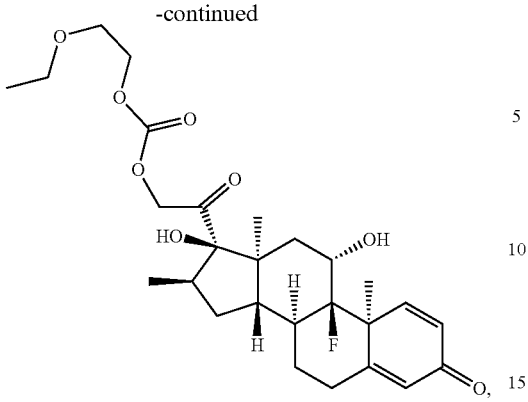

the solid crystalline form being characterized by an X-ray powder diffraction (XRPD) pattern comprising peaks at: 3.8°±0.2° 2θ, 7.6°±0.2° 2θ, 8.8°±0.2° 2θ, 9.72±0.2° 2θ, and 12.2°±0.2° 2θ.

2. The solid crystalline form of claim 1, wherein the XRPD pattern is further characterized by peaks at: 10.6°±0.2° 2θ, 13.4°±0.2° 2θ, and 14.6°±0.2° 2θ.

3. A solid crystalline form of a compound represented by the following formula:

Compound 1

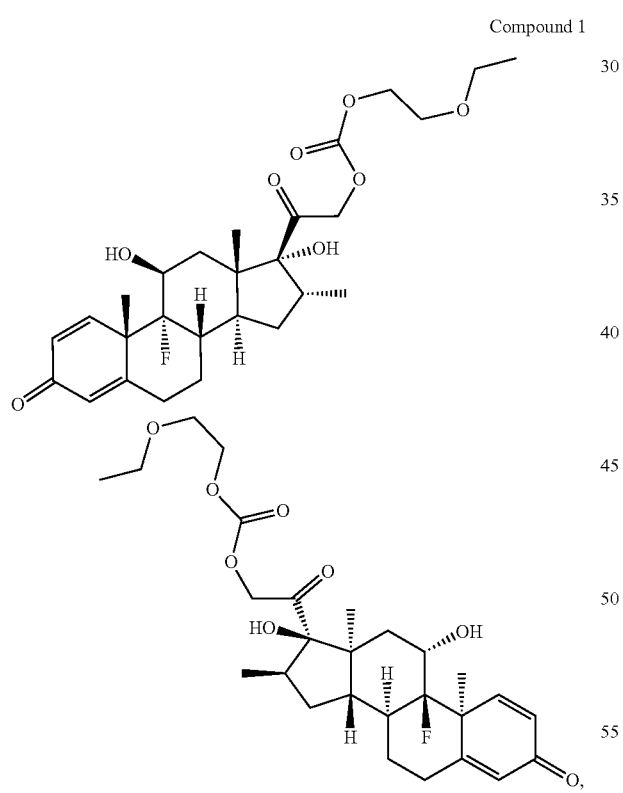

the solid crystalline form being characterized by an X-ray powder diffraction (XRPD) pattern comprising peaks at: 3.9°±0.2° 2θ, 7.9°±0.2° 2θ, 9.7°±0.2° 2θ, 12.0°±0.2° 2θ, and 15.9°±0.2° 2θ.

4. The solid crystalline form of claim 3, wherein the XRPD pattern is further characterized by peaks at: 4.8°±0.2° 2θ, 5.7°±0.2° 2θ, 6.7°±0.2° 2θ, 8.7°±0.2° 2θ, 13.5°±0.2° 2θ, 14.6°±0.2° 2θ, and 17.3°±0.2° 2θ.

5. A solid crystalline form of a compound represented by the following formula:

Compound 1

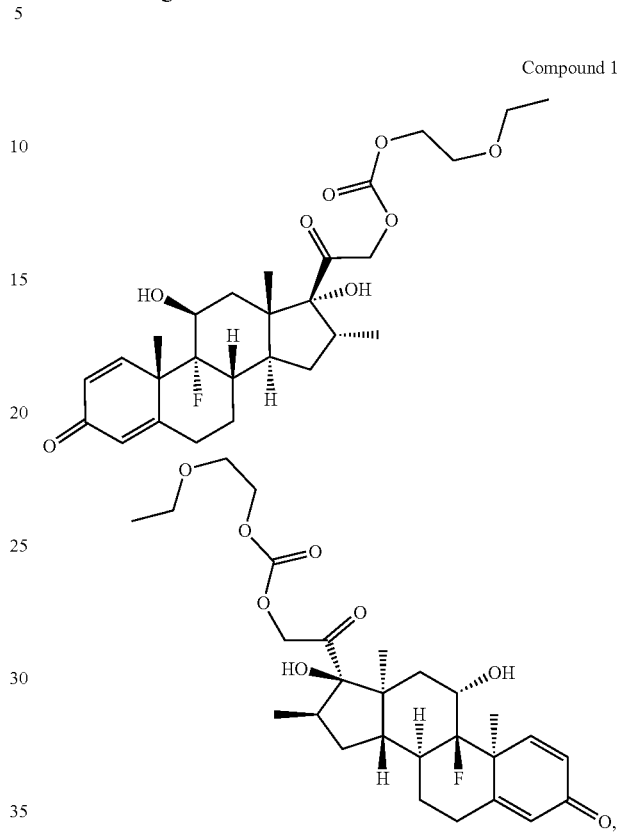

the solid crystalline form being characterized by an X-ray powder diffraction XRPD pattern comprising peaks at: 8.9°±0.2° 2θ, 11.4°±0.2° 2θ, 14.1°±0.2° 2θ, 16.4°±0.2° 2θ, and 17.1°±0.2° 2θ.

6. The solid crystalline form of claim 5, wherein the XRPD pattern is further characterized by peaks at: 7.0°±0.2° 2θ, 17.9°±0.2° 2θ, 19.1°±0.2° 2θ, 19.8°±0.2° 2θ, and 20.3°±0.2° 2θ.

7. An article comprising the solid crystalline form of claim 1, wherein at least 70% weight by weight (w/w) of the article is Compound 1.

8. An article comprising the solid crystalline form of claim 2, wherein at least 70% weight by weight (w/w) of the article is Compound 1.

9. An article comprising the solid crystalline form of claim 3, wherein at least 70% weight by weight (w/w) of the article is Compound 1.

10. An article comprising the solid crystalline form of claim 4, wherein at least 70% weight by weight (w/w) of the article is Compound 1.

11. An article comprising the solid crystalline form of claim 5, wherein at least 70% weight by weight (w/w) of the article is Compound 1.

12. An article comprising the solid crystalline form of claim 6, wherein at least 70% weight by weight (w/w) of the article is Compound 1.

* * * * *